(12) United States Patent
Shaddix et al.

(10) Patent No.: US 12,205,365 B2
(45) Date of Patent: Jan. 21, 2025

(54) SYSTEM AND METHOD FOR SPACE OBJECT DETECTION IN DAYTIME SKY IMAGES

(71) Applicant: Slingshot Aerospace, Inc., Austin, TX (US)

(72) Inventors: Jeffrey Hale Shaddix, Fort Collins, CO (US); Austin Tyler Hariri, Fort Collins, CO (US); Jeffrey Michael Aristoff, Fort Collins, CO (US)

(73) Assignee: Slingshot Aerospace, Inc., Austin, TX (US)

( * ) Notice: Subject to any disclaimer, the term of this patent is extended or adjusted under 35 U.S.C. 154(b) by 0 days.

(21) Appl. No.: 18/150,965

(22) Filed: Jan. 6, 2023

(65) Prior Publication Data

US 2023/0154179 A1  May 18, 2023

Related U.S. Application Data

(63) Continuation of application No. 16/940,346, filed on Jul. 27, 2020, now Pat. No. 11,587,311, which is a (Continued)

(51) Int. Cl.
  *G06V 20/13* (2022.01)
  *G06F 16/909* (2019.01)
  (Continued)

(52) U.S. Cl.
  CPC ............ *G06V 20/13* (2022.01); *G06F 16/909* (2019.01); *G06F 18/2113* (2023.01);
  (Continued)

(58) Field of Classification Search
  None
  See application file for complete search history.

(56) References Cited

U.S. PATENT DOCUMENTS 5,960,097 A     9/1999  Pfeiffer et al.
7,349,804 B2 *  3/2008  Belenkii ............ G01C 21/025
                                             701/523
(Continued)

FOREIGN PATENT DOCUMENTS

KR      101364052 B1    2/2014
KR      101681178 B1    11/2016
(Continued)

OTHER PUBLICATIONS

Non-Traditional Data Collection and Exploitation for Improved GEO SSA via a Global Network of Heterogeneous Sensors Aristoff, Jeff; Dhingra, Neil; Ferris, Alex; Hariri, Austin; Horwood, Joshua; Larson, Ari; Lyons, Tyler; Shaddix, Jeff; Singh, Navraj; Wilson, Kevin (Year: 2019).*

(Continued)

*Primary Examiner* — Nancy Bitar
(74) *Attorney, Agent, or Firm* — Wilson Sonsini Goodrich & Rosati

(57) ABSTRACT

In some embodiments, space objects may be detected within shortwave infrared (SWIR) images captured during the daytime. Some embodiments include obtaining a stacked image by stacking shortwave infrared (SWIR) images. A spatial background-difference image may be generated based on the stacked image, and a matched-filter image may be obtained based on the spatial background-difference image. A binary mask may be generated based on the matched-filter image. The binary mask may include a plurality of bits each of which including a first value or a second value based on whether a signal-to-noise ratio (SNR) associated with that bit satisfies a threshold condition. Output data may be generated based on the spatial background-difference image and the binary mask, where the output data provides observations on detected space objects in orbit.

23 Claims, 10 Drawing Sheets

Related U.S. Application Data continuation of application No. 16/843,820, filed on Apr. 8, 2020, now Pat. No. 10,740,609.

(60) Provisional application No. 62/894,210, filed on Aug. 30, 2019.

(51) Int. Cl.
*G06F 18/2113* (2023.01)
*G06F 18/23* (2023.01)
*G06V 10/60* (2022.01)
*G06V 10/75* (2022.01)
*G06V 20/10* (2022.01)

(52) U.S. Cl.
CPC ............. *G06F 18/23* (2023.01); *G06V 10/60* (2022.01); *G06V 10/7515* (2022.01); *G06V 20/194* (2022.01)

(56) References Cited

U.S. PATENT DOCUMENTS

| | | |
|---|---|---|
| 8,511,614 B2 | 8/2013 | Robinson |
| 8,687,110 B1 | 4/2014 | Gardner |
| 9,423,341 B1 | 8/2016 | Jim et al. |
| 9,689,747 B1 | 6/2017 | Stone |
| 10,012,547 B1 | 7/2018 | Stone |
| 10,250,831 B2 | 4/2019 | Tyrrell et al. |
| 10,648,960 B2 | 5/2020 | Kester et al. |
| 10,740,609 B1 | 8/2020 | Shaddix et al. |
| 10,978,600 B1 | 4/2021 | Danan et al. |
| 11,587,311 B2 | 2/2023 | Shaddix et al. |
| 2013/0250104 A1 | 9/2013 | Williams |
| 2014/0168445 A1* | 6/2014 | Hogasten ............... H04N 23/80 348/164 |
| 2016/0349228 A1 | 12/2016 | Kester et al. |
| 2018/0035067 A1 | 2/2018 | Tyrrell et al. |
| 2021/0064849 A1* | 3/2021 | Shaddix .................. G06F 18/23 |
| 2021/0079355 A1 | 3/2021 | Peterson et al. |

FOREIGN PATENT DOCUMENTS

| | | | |
|---|---|---|---|
| WO | WO-2020191427 A1 * | 10/2020 | ............... B64G 3/00 |
| WO | WO-2021041918 A1 | 3/2021 | |

OTHER PUBLICATIONS

International Preliminary Report on Patentability dated Mar. 10, 2022 for PCT/US2020/048555.

International search report with written opinion dated Nov. 25, 2020 for PCT/US2020/048555.

Notice of Allowance dated Jun. 19, 2020 for U.S. Appl. No. 16/843,820.

Notice of Allowance dated Oct. 11, 2022 for U.S. Appl. No. 16/940,346.

Notice of Allowance dated Oct. 24, 2022 for U.S. Appl. No. 16/940,346.

EP20856822.0 Extended European Search Report dated Aug. 11, 2023.

Shaddix, J. et al., Daytime GEO Tracking with "Aquila": Approach and Results from a New Ground-Based SWIR Small Telescope System, Advanced Maui Optical and Space Surveillance Technologies Conference (AMOS), https://amostech.com/TechnicalPapers/2019/Optical-Systems-&-Instrumental/Shaddix.pdf, (Sep. 1, 2019).

* cited by examiner

800

| 0 | 0 | 0 | 0 | 0 | 0 | 0 | 0 | 0 | 0 |
|---|---|---|---|---|---|---|---|---|---|
| 0 | 0 | 1 | 0 | 0 | 0 | 0 | 0 | 0 | 0 |
| 0 | 0 | 1 | 1 | 0 | 0 | 0 | 1 | 1 | 0 |
| 0 | 0 | 1 | 1 | 0 | 0 | 0 | 1 | 1 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

802 → (cell in row 4)
804 → (cell in bottom-left)

852 → (cell in grid)
854 → (cell in bottom-left)

SYSTEM AND METHOD FOR SPACE OBJECT DETECTION IN DAYTIME SKY IMAGES

RELATED APPLICATIONS

This application is a continuation of U.S. patent application Ser. No. 16/940,346, filed on Jul. 27, 2020, which is a continuation of U.S. patent application Ser. No. 16/843,820 (now U.S. Pat. No. 10,740,609), filed on Apr. 8, 2020, which claims the benefit of U.S. Provisional Application No. 62/894,210, filed on Aug. 30, 2019, entitled "SWIR-Based Space Object Detection System," each of which is incorporated herein by reference in its entirety.

FIELD

This application generally relates to detecting space objects using shortwave infrared (SWIR) sensors during daytime hours, including systems and methods for improving a signal-to-noise ratio (SNR) in SWIR images collected during daytime hours to detect satellites and/or other space objects.

BACKGROUND

Space-based systems are used for national defense purposes as well as for facilitating many aspects of modern life. Every year, a growing number of satellites are launched into orbit, making the space environment increasingly congested and contested. This trend challenges the ability to maintain space situational awareness through an up-to-date space object catalog, and to maintain space control through detection and mitigation of potential on-orbit threats. Due to the bright sky background, ground-based telescopes are generally unable to view high-altitude satellites during the day. Satellites can also be difficult to track by radars given their limited geographic distribution and range limitations. As a result, there are periods of unobserved time each day when potentially hazardous and/or nefarious space object can maneuver undetected from the ground, which could cause satellite operators to lose custody, as well as potentially putting nearby satellites at risk.

Ground-based optical telescopes are constrained to operating during the night due to the increase in photon shot noise and saturation potential from the daytime sky background. While some ground-based systems have addressed such issues, these systems are typically costly. Space-based systems may also be used during daytime hours, and do not experience detection issues due to photon shot noise, but are also costly and have limitations due to their observational patterns, their need to deal with solar avoidance, and their relatively long latency in sending tracking data to the ground. Ground-based passive radio frequency (RF) systems may detect Resident Space Objects (RSOs) during daytime hours, but these RSOs must be actively transmitting data to a satellite ground station. As a result, most RSOs are not observed during daytime hours, leaving nearby RSOs vulnerable to hazardous and/or nefarious activity.

SUMMARY

Aspects of the present application relate to methods, apparatuses, and/or systems for detecting space objects within shortwave infrared (SWIR) images captured during daytime exposure. In some embodiments, the present application may describe detecting space objects within SWIR images of the daytime sky without the use of cryogenic cooling components.

In some embodiments, a stacked image may be obtained by stacking images, such as shortwave infrared (SWIR) images of the daytime sky. Each SWIR image may be obtained from a camera system including one or more SWIR sensors and one or more thermoelectric coolers (TECs). A spatial background-difference image may be generated based on the stacked image, and a matched-filter image may be obtained based on the spatial background-difference image. A binary mask may be generated based on the matched-filter image. The binary mask may include a plurality of bits each of which including a first value or a second value based on whether a signal-to-noise ratio (SNR) associated with that bit satisfies a threshold condition. Output data may be generated based on the spatial background-difference image and the binary mask, where the output data indicates whether a space object in orbit has been detected.

Various other aspects, features, and advantages of the present application will be apparent through the detailed description of the present application and the drawings attached hereto. It is also to be understood that both the foregoing general description and the following detailed description are exemplary and not restrictive of the scope of the present application.

BRIEF DESCRIPTION OF THE DRAWINGS

FIGS. 8A and 8B show illustrative diagrams of exemplary binary masks, in accordance with various embodiments;

DETAILED DESCRIPTION

Figure 1:
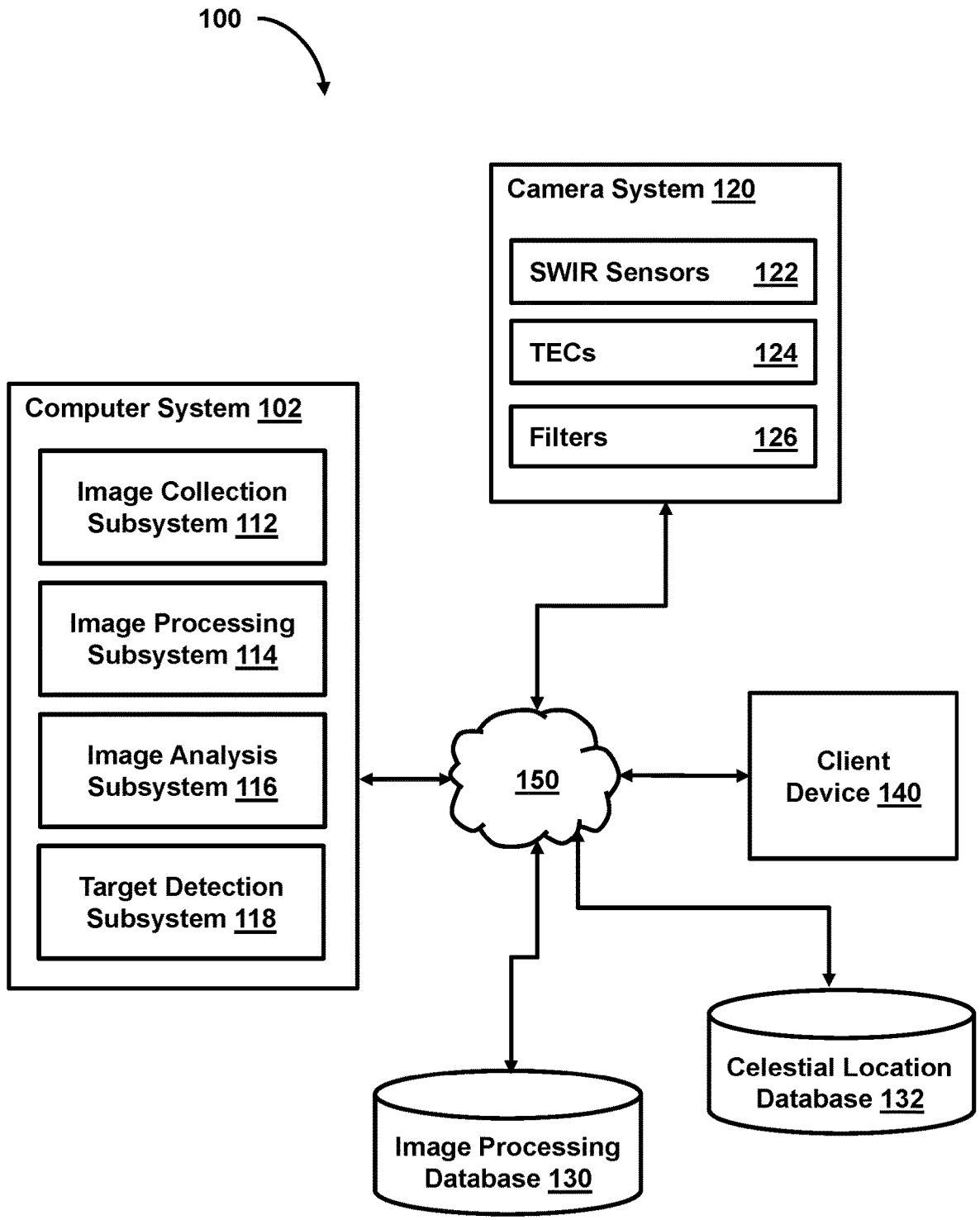
FIG. 1 shows an exemplary system for detecting space objects in orbit within shortwave infrared (SWIR) images of daytime sky, in accordance with various embodiments.

In the following description, for the purposes of explanation, numerous specific details are set forth in order to provide a thorough understanding of the embodiments of the present application. It will be appreciated, however, by those having skill in the art that the embodiments of the present application may be practiced without these specific details or with an equivalent arrangement. In other instances, well-known structures and devices are shown in block diagram form in order to avoid unnecessarily obscuring the embodiments of the present application.

Due to space becoming a strategic environment for military and commercial activities, both government and commercial stakeholders are turning to industry to supply cost-effective Space Situational Awareness (SSA) solutions. Ground-based telescope networks can be one important component of these solutions, however ground-based telescope networks have historically been handicapped by night-only operation due to their inability to observe relatively dim objects through the intense sky background brightness during the day. The sky's background brightness can quickly saturate sensors of ground-based optical telescopes, thereby reducing their detection potential as a result of the large increase in photon shot noise (time-dependent fluctuation of photon current/number of photons). This sensor saturation issue essentially renders the space defense mission blind during the day. Described herein are technical solutions to the aforementioned issues, including techniques for implementing low-cost ground-based telescopes to observe satellites during daylight conditions. Furthermore, described herein are techniques for implementing ground-based telescopes that do not use cryogenic sensor cooling techniques, nor optics actively cooled below ambient temperature.

Space-based sensors offer observing capability during daylight hours without terrestrial weather or lighting concerns. However, these space-based sensors are costly, are limited by predictable observation patterns, and cannot observe objects while pointing within several degrees of the sun to avoid damaging their sensor systems. Ground-based passive radio frequency (RF) systems may detect active RSOs throughout daytime hours (or nighttime hours), but only when those satellites are actively transmitting. Furthermore, ground-based radars are both expensive to operate and deploy, and are typically limited to observing RSOs in low Earth orbit (LEO) and RSOs in highly elliptical orbit (HEO) near perigee due to power constraints.

In some embodiments, a satellite tracking system may be configured to sense in shortwave infrared (SWIR) to mitigate the challenge of daytime imaging. For example, the satellite tracking system may include SWIR sensors configured to sense wavelengths between 0.7 microns and 2.5 microns, such as wavelengths between 0.9 microns and 1.7 microns. SWIR sensors provides two complementary benefits: (i) the diffuse sky spectral surface brightness is approximately two orders of magnitude lower in regions of the sky in SWIR than visible, and (ii) the spectral reflectance profile (e.g., the ability to reflect or absorb EM radiation) of many satellites markedly increases for wavelengths around 1.0 micron (where visible sensors fall off). In some embodiments, the satellite tracking system may utilize SWIR sensors configured for wavelengths in a range of 0.7-2.3 microns. For example, the SWIR sensors may be configured for wavelengths in a range of 1.0-1.2 microns, 1.0-1.4 microns, 1.2-1.7 microns, 1.4-1.7 microns, or other ranges between 1.0-1.7 microns. As discussed herein, such embodiments enable low-cost ground-based optical solutions to track and detect RSOs during daytime hours, or more generally, for periods of time with high-intensity background noise. Some embodiments include low-cost ground-based optical solutions that do not use any cryogenic cooling techniques.

In some cases, RSOs may be predominantly illuminated by direct sunlight at night (i.e., light from the sun), however RSOs may also be affected by earthshine reflection during the day (i.e., light reflected by Earth's surface). Even though both of these sources provide more incident light for reflection in the visible wavelength range than the SWIR range, daytime sensing in SWIR may provide an order of magnitude improvement in signal-to-noise ratio (SNR) as a result of the reduction in noise being much greater than the reduction in signal. Likewise, the reduced background flux in the SWIR allows for longer integration times before sensor saturation.

In some embodiments, the satellite tracking system may include a camera system. The camera system may include a plurality of SWIR sensors and an optical train, which may refer to an assembly of optical components including, but not limited to, lenses and mirrors. For example, the optical train may include a collection of components including one or more mirrors, lenses, filters, stops, apertures, windows, and/or cameras. The optical train may be designed to maximize SWIR throughput while also minimizing a SWIR sensor's spot size for point-source targets. The satellite tracking system may have a small field-of-view so as to cut through the skylight surface brightness and improve detectability. In some embodiments, the satellite tracking system may include multiple filters to maintain saturation control and provide the SWIR sensor target characterization potential.

Despite the special components of the camera system, the imaging techniques typically used for nighttime observations are generally not applicable for daytime observations. In some embodiments, imaging techniques for daytime observations may include acquiring SWIR images at high data rates and stacking the SWIR images effectively to reduce noise effects. For example, SWIR images may be captured at a rate of 100 Hz or higher, which may result in over 10 GB of data being collected for every 1-minute of observation.

During the daytime, an image of the sky may not include any visible stars. While the stars are still "there," the light signal from the stars is drowned out by the background sky. There may be three main reasons for this: (i) saturation, (ii) quantization, and (iii) noise. With regard to saturation, the daytime sky's background is very bright, and therefore the details of the sky may not be properly captured. In this scenario, the photosites (e.g., physical sensor elements of a camera that produce pixels in an image) may have reached full-well condition where no more electrons may be collected before readout, or the analog-to-digital conversion (ADC) may have reached a maximum digital output level. Regardless of the reason, the star's signal may be lost. With regards to quantization, a short exposure time may be used to retain detail from the sky. However, in this scenario, the amount of signal from the stars may be too low to register a digital count after ADC.

The problems associated with (i) and (ii) may be mitigated if a large lens is used, such as a telescope. However, telescopes may still be inhibited by photon shot noise. The number of photons from a light source collected by a sensor over an exposure period is not constant, but instead follows a Poisson distribution. Thus, in a single exposure, even for a flat (e.g., constant) background, each photosite collects a different amount of charge. The SNR is the standard measure of signal contrast in the presence of noise, and is defined as the ratio of signal to the standard deviation of the noise. The standard deviation of photon shot noise is equal to the square root of the noise source's signal level (in photoelectrons).

Thus, a bright daytime sky may produce significant photon shot noise, hampering the visibility of stars and other space objects.

In some embodiments, the spectral noise may be approximated using Equation 1:

$$SNR(\lambda) \approx \frac{S_t(\lambda)}{\sqrt{S_b(\lambda)}}. \qquad \text{Equation 1}$$

In Equation 1, $S_t(\lambda)$ may be a background-subtracted target signal in electrons, $S_b(\lambda)$ may be a background signal in electrons, and $\lambda$ is the wavelength of light. In some embodiments, additional factors may affect the SNR, such as imperfect background subtractions, atmospheric turbulence, variability of satellite signal, or other factors. In some embodiments, Equation 1 is dependent on an absolute signal level of a space object (e.g., a satellite), which may be a function of solar angle, range, attitude, material, and other factors. Therefore, in some embodiments, the SNR may be normalized for a particular wavelength. As an example, the wavelength utilized for normalizing the SNR of Equation 1 may be 550 nm, the approximate center wavelength of the Johnson V magnitude system, yielding Equation 2:

$$SNR_{relative}(\lambda) = \frac{SNR(\lambda)}{SNR_{550nm}} = \frac{S_t(\lambda)\sqrt{S_{b,550nm}}}{S_{t,550nm}\sqrt{S_b(\lambda)}}. \qquad \text{Equation 2}$$

In some embodiments, the spectral flux of a satellite incident on a ground observer may be based on source radiation, material reflectivity, and atmospheric transmission. In some embodiments, electromagnetic (EM) radiation received by an observer (e.g., a sensor) from a target (e.g., a satellite) may have been emitted by the target or reflected by the target. For typical space object temperatures, blackbody emission may be considered negligible when compared to reflected signals at the analyzed wavelengths. For night observation, the dominant reflected source is the sun. For day observation, the dominant source is not as clear, and depending on the sun-target-observer (or solar phase) angle and the physical geometry of the target, solar reflection may be rivaled by earthshine (e.g., solar illumination of the Earth reflecting onto the satellite, then reflecting back to Earth). Earthshine may increase as it approaches a maximum at the satellite's local noon. Even night observation telescopes may be recognizing this effect at high phase angles. For instance, diffuse earthshine may dominate the reflected signal. Molecular absorption may also lead to a reduction in reflectivity in various SWIR bands. Space object (e.g., satellite) illumination may be considered an additive mixture of these two sources and may be restricted by considering the individual cases of sole sunshine and sole earthshine.

The illumination incident on a space object may be reflected by the space object's materials. These materials may include multi-layer insulation (MLI), various paints, solar panels made from GaAs or Silicon, and/or other materials. The materials may have strong spectral features, and the signal spectral profile, and thus the relative SNR, may depend on the composition of the reflecting materials. Spectral characterization efforts of space objects have provided evidence that RSOs exhibit higher reflectivity in the near-infrared (NIR) to SWIR regime, particularly around 1.1 microns. Additionally, pre-determined models for atmospheric transmission may be used to determine the impact of the atmosphere on light reflecting off of a space object that travels through the atmosphere to a ground observer.

At night, the sky's background may vary widely by proximity to terrestrial light pollution, lunar phase, and lunar position relative to the observer line-of-sight (LOS). At a dark site on a new moon night, the atmosphere is still radiating a small amount of light, called airglow, which has been measured to be brighter in the infrared than the visible. During the day, light pollution and lunar conditions are insignificant compared to the diffuse skylight of the atmosphere. The photon shot noise produced from this skylight may dominate the noise for a ground observer. Rayleigh scattering shifts the solar spectral flux toward blue, and attenuates toward the infrared. Models for daylight sky surface brightness may be precomputed and depend on a function of time of year, solar elevation, and viewing angles.

During the day, spectral sensing efficiency significantly increases in the near and short-wave infrared, reaching levels of 10 times or higher SNR values versus visible (according to Equation 2) throughout the H and K photometry bands. This effect may stronger with direct solar illumination compared to earthshine, but both typically follow the same trend.

FIG. 1 shows an exemplary system for detecting space objects in orbit within SWIR images of daytime sky, in accordance with various embodiments. As shown in FIG. 1, system 100 may include computer system 102, camera system 120, image processing database 130, celestial location database 132, client device 140, and/or other components. Camera system 120 may include a plurality of short-wave infrared (SWIR) sensors, one or more thermoelectric coolers (TECs) 124 with or without liquid heat transfer assistance, one or more filters 126, and/or other components. Computer system 102 may include image collection subsystem 112, image processing subsystem 114, image analysis subsystem 116, target detection subsystem 118, and/or other components. Client device 140 may include any type of mobile terminal, fixed terminal, or other device. By way of example, client device 140 may include a desktop computer, a notebook computer, a tablet computer, a smartphone, a wearable device, or other client device. Users may, for instance, utilize one or more client devices 140 to interact with one another, one or more servers, or other components of system 100. It should be noted that while one or more operations are described herein as being performed by particular components of computer system 102, those operations may, in some embodiments, be performed by other components of computer system 102 or other components of system 100. As an example, while one or more operations are described herein as being performed by components of computer system 102, those operations may, in some embodiments, be performed by components of client device 140.

In some embodiments, system 100 may be configured to determine whether a space object is present in a daytime sky background by analyzing SWIR images of the daytime sky background. System 100 may obtain the SWIR images of a daytime sky, then generate a spatial background-difference image of the daytime sky background where one or more offsets (e.g., noise, bias, etc.) and/or one or more gains have been accounted for, thereby correcting for pixel-to-pixel nonuniformities. In some embodiments, the SWIR images may be images received by a camera system that includes SWIR sensors, such as camera system 120 including SWIR sensors 122. However, alternatively or additionally, system 100 may obtain non-SWIR images of the daytime sky, and the foregoing is not limited to only those systems that obtain SWIR images. System 100 may further generate a binary mask based on a matched filter image of the daytime sky, where the binary mask includes bits corresponding pixels of the matched-filter image. The matched-filter image may be used to perform target detection. In some embodiments, to generate, or otherwise obtain, the matched-filter image, a convolution may be performed where the spatial background-difference image is convolved with a point-source function kernel. For example, the point-source function kernel may be a 2D Gaussian function or an Airy function. Each bit may have either a first value (e.g., a logical 1) or a second value (e.g., a logical 0) determined based on whether a signal-to-noise ratio (SNR) of a matched-filter numerical value of each pixel of the array of pixels of the matched-filter image satisfies a threshold condition. Based on the binary mask and/or the spatial background-difference image, output data may be generated. In some embodiments, the output data includes an output image. For instance, the output image may include the spatial background-difference image and/or the matched-filter image, and observation information on any space objects in orbit that were detected. In some embodiments, one or more candidate space objects within the matched-filter image may be determined based on the binary mask by clustering bits having the first value or the second value. For example, clusters of logical 1 bits may be used to identify candidate space objects. In some embodiments, a determination may be made as to whether any of the candidate space objects are a space object (e.g., a satellite) in orbit. For instance, confidence measures may be used to determine whether a candidate space object is a false positive.

In some embodiments, confidence measures may include applying one or more filters to the candidate space objects (or data representing the candidate space objects) to verify the presence of a space object or objects in orbit. For example, space object location information may be used to determine whether any of the candidate space objects represent space objects in orbit. The space object location information may indicate celestial positions of known space objects in orbits at any given time of day. Based on the space object location information, a determination may be made as to whether a given candidate space object represents a known space object in orbit based on a right ascension and declination of the candidate space object and known space object at a time that the SWIR images were captured. As another example, multiple frames (e.g., multiple SWIR images) may be analyzed to determine whether a candidate space object is a space object in orbit. For instance, if a candidate space object was not verifiable via the space object location information, but was detected in multiple, temporally consecutive, SWIR images, then the candidate space object may be an unknown space object in orbit. The new space object in orbit may have its location (e.g., right ascension and declination) stored for future observations.

Camera System 120

In some embodiments, camera system 120 may include a plurality of shortwave infrared (SWIR) sensors 122, one or more thermoelectric coolers (TECs) 124 with or without liquid heat transfer assistance, and one or more filters 126. In some embodiments, camera system 120 may include or be communicatively coupled to a telescope or imaging device with telescopic viewing capabilities. In some embodiments, a number of SWIR sensors 122 included within camera system 120 may depend on a size of camera system 120, a viewing power (e.g., magnification) of camera system 120, cost, and/or other factors. For example, the number of instances of SWIR sensors 122 may be 4 or more, 8 or more, 16 or more, 32 or more, 64 or more, 128 or more, 256 or more, 512 or more, or 1024 or more and so on. In some embodiments, the number of instance of SWIR sensors 122 may depend on a desired resolution (e.g., a number of pixels of an array of pixels) of the captured image. For example, the number of instances of SWIR sensors 122 may be selected so as to capture images having a resolution of 640×512 (e.g., pixels), 1280×1024 (e.g., pixels), or other resolutions.

In some embodiments, SWIR sensors 122 may be formed using various substrates such as InGaAs, HgCdTe, or InSb. Each substrate may have different quantum efficiency (QE) characteristics, which describes a sensor's ability to convert incident photons into electrons. In some embodiments, SWIR sensors 122 may be InGaAs sensors that are sensitive down to about 1.7 microns, referred to herein as "InGaAs 1.7 sensors." Use of InGaAs 1.7 sensors for SWIR sensors 122 may advantageously provide reduction in dark current detection and thermal emission sensitivity. For instance, dark current may cause charge to build up on a sensor in the absence of incident light. An amount of dark current detected by a sensor may be based on sensor type and sensor temperature. For visible sensors (e.g., sensors detecting light in the visible portion of the EM spectrum), dark current is typically insignificant for daytime sky lighting conditions. However, for SWIR sensors, such as SWIR sensors 122, the photon shot noise from dark current may be equal to or greater than the daytime sky's background light. In some embodiments, TECs 124 with or without liquid assist may be operatively coupled to SWIR sensors 122 so as to cool SWIR sensors 122, thereby preventing the shot noise from the dark current to be equal to or greater than the shot noise from the daytime sky's background light.

In some embodiments, an amount of photon shot noise may be dependent on the cooling system employed by camera system 120. For example, SWIR sensors 122 including InGaAs 1.7 sensitivity may produce and maintain dark currents less than or equal to 100 kilo-electrons per pixel per second (ke–/p/s) using TECs 124 to cool camera system 120. In some embodiments, camera system 120 may be cooled by TECs 124 to temperatures within a range of –40 to 0 degrees Celsius. In some embodiments, camera system 120 may be cooled by TECs 124 to temperatures within a range of –70 to –40 degrees Celsius. For instance, with liquid assisted TECs, cooling camera system 120 to temperatures within the range of –70 to –40 degrees Celsius may be beneficial for cameras having cutoff wavelengths longer than 1.7 microns. Generally, TECs 124 may provide sustainable sensor temperatures in outdoor environments for camera system 120. While some embodiments include camera system 120 having sensors sensitive to longer wavelengths (e.g., sensors sensitive to wavelengths equal to or greater than 2.5 microns), such camera systems need cryogenic cooling systems to reach these low dark current levels. However, by using TECs 124 camera system 120 allows for reduced maintenance costs and manpower that would otherwise be needed to operate a cryogenic cooling system. In some embodiments, camera system 120 including SWIR sensors 122 that are sensitive down to wavelengths of 1.7 microns may also reduce or eliminate the need for cold stops and/or cooled optical elements. Therefore, by employing TECs 124 for cooling purposes, camera system 120 may be less costly to produce and maintain. Furthermore, in some embodiments, camera system 120 may include SWIR sensors 122 that are not sensitive above wavelengths of 1.7-2.3 microns, thereby also facilitating a reduction or elimination of the need for cold stops and/or cooled optical elements to prevent the sensor capturing self-emission.

In some embodiments, filters 126 may include one or more longpass filters. For example, filters 126 may include a 1.0 micron longpass filter. In some embodiments, no filter may be needed. For example, if SWIR sensors 122 correspond to InGaAs 1.7 sensors having a QE starting at approximately 1 micron, camera system 120 may not include filters 126 (or may not include any longpass filters). In some embodiments, filters 126 may further include one or more longpass filters at longer wavelengths (e.g., equal to or greater than 1.0 microns). Longpass filters at longer wavelengths may be used, for example, with frame rate changes to prevent camera saturation during SWIR image capturing.

In some embodiments, camera system 120 may be configured to capture a plurality of SWIR images at a particular frame rate and for a particular exposure time. The exposure time to be used may depend on a time of day when the SWIR images are to be captured. For example, camera system 120 may use a maximal exposure time to capture SWIR images during the night.

As another example, and differing from nighttime exposure times, a shorter exposure time may be used to obtain a reasonable background level during the day. In some embodiments, camera system 120 may be configured to capture a plurality of non-SWIR images (e.g., images captured by a camera system not including SWIR sensors 122, or images captured by a camera system including SWIR sensors but configured to detect light at non-infrared wavelengths). In some embodiments, ADC gain may be lowered to mitigate the problem, but this may result in an increase in readout noise. To reduce the background signal, camera system 120 may cause an f-number (e.g., a ratio of focal length to aperture diameter) of a telescope (e.g., a telescope included within or communicatively coupled to camera system 120), to be increased, or may select a sensor with smaller pixel size. Both of these options may reduce the solid angle subtended by each SWIR sensor 122, reducing background noise while also reducing field-of-view (FOV).

In some embodiments, camera system 120 may utilize short exposure times (e.g., equal to or less than 10 ms) to help avoid saturation of SWIR sensors 122. In some embodiments, camera system 120 may additionally utilize high framerates (e.g., equal to or greater than 100 Hz) to maximize duty cycle. Captured SWIR images (e.g., frames) may be stacked and calibrated to reduce noise from the daytime sky background and noise from SWIR sensors 122, thereby increasing SNR over individual SWIR images. For example, by stacking and calibrating the SWIR images, nonuniformity and nonlinearity in the SWIR images may be corrected. In some embodiments, filters 126 may include lowpass filters configured to block low wavelength regions of the SWIR portion of the EM spectrum from reaching SWIR sensors 122 to help avoid saturation. For example, filters 126 may include a set of lowpass filters with cutoff wavelengths of 1.0 microns, 1.2 microns, and 1.4 microns. Lowpass filters may block light having wavelengths lower (e.g., frequencies higher) than their respective cutoff wavelengths (e.g., cutoff frequencies). In some embodiments, other cutoff wavelengths may be used in addition to, or instead of, cutoff wavelength of 1.0 microns, 1.2 microns, and 1.4 microns. For example, filters 126 may include lowpass filters having cutoff wavelengths selected between 0.9-1.7 microns. In some embodiments, filters 126 may include one or more IR polarizers. The IR polarizers may be selected based on expected angle of polarization of the daytime sky at the point of observation, to reduce the effect of the daytime sky more than the target signatures.

Subsystems 112-118

In some embodiments, image collection subsystem 112 may be configured to obtain a plurality of SWIR images from camera system 120. The number of SWIR images to be captured by camera system 120 may be based on computer program instructions generated by, and received from, image collection subsystem 112. For instance, image collection subsystem 112 may provide computer program instructions to camera system 120 indicating how many SWIR images are to be captured, a frame rate to be used when capturing SWIR images, an exposure time for capturing SWIR images, a direction/orientation to be used to capture the SWIR images (e.g., so as to capture a certain portion of the daytime sky), and/or additional information. In some embodiments, the computer program instructions pre-programmed by an individual via client device 140 and sent to computer system 102 via network(s) 150. In some embodiments, the computer program instructions may be input by an individual operating computer system 102 and may be provided to camera system 120 via network(s) 150 in real-time.

The trade between larger apertures and saturation may cause exposure times for camera system 120 to remain short. In some embodiments, image processing subsystem 114 may use frame stacking techniques to maximize detectability, as described below. In some embodiments, image collection subsystem 112 may be configured to match a frame rate of camera system 120 to the exposure time such that camera system 120 may continuously collect SWIR images. For example, image collection subsystem 112 may configure camera system 120 to run at a near 100% duty cycle, where the duty cycle is defined as the percentage of time spent integrating on SWIR sensors 122. Under daytime sky conditions, this may correspond to SWIR sensors 122 to operating at frame rates in a range of 100-500 Hz, 500-1,000 Hz, 100-1,000 Hz, or other frame rates. In some embodiments, image collection subsystem 112 may cause camera system 120 to acquire a plurality of SWIR images, also referred to herein interchangeably as frames, at a rate (e.g., a frame rate) of 100 Hz or more, depending on scene conditions. In some embodiments, image collection subsystem 112 may obtain the SWIR images of the daytime sky from camera system 120 via network(s) 150. Image collection subsystem 112 may provide the obtained SWIR images to image processing subsystem 114 to be processed.

In some embodiments, image processing subsystem 114 may be configured to perform various image processing techniques to the captured SWIR images. For example, image processing subsystem 114 may perform image stacking on the captured SWIR images. Stacking SWIR images may include data from 60 seconds or longer for a single observation frame, combining >10 GB of data for a single observation. In some embodiments, stacking of N frames can produce a SNR improvement equal to approximately $\sqrt{N}$. However, this improvement in SNR is typically limited by 1/F noise and pixel response non-uniformity (PRNU). In some embodiments, 1/F noise, which may also be referred to herein interchangeably as "flicker noise," describes an approximate inverse relationship between noise and frequency, and is inherent to electrical interfaces. Generally, image stacking, also referred to as "frame stacking," (e.g., temporal low-pass filtering) is not as effective on 1/F noise (e.g., temporally correlated noise) as compared to white noise (e.g., temporally uncorrelated noise). In some embodiments, PRNU describes the variability of a signal from each SWIR sensor 122 with respect to incident light. The PRNU may be precomputed (e.g., prior to performing observations). As detailed below, a custom calibration routine may be used to accurately measure the variability and determine an offset value to be applied to each SWIR sensor 122.

Image processing subsystem 114 may generate a spatial background-difference image. In some embodiments, to generate the spatial background-difference image, a stacked image may be generated first, which may then be adjusted to account for one or more offsets and/or gains. The version of the stacked image that accounts for the one or more offsets and/or gains, and corrected for faulty pixels, may be referred to as a clean image. The stacked image may be generated by stacking the plurality of captured SWIR images of the daytime sky. The clean image may account for variabilities of each SWIR sensor 122 (e.g., PRNU), noise associated with the stacked image, inherent biases from electronics of camera system 120, vignetting in the SWIR image, and/or other factors. In some embodiments, one or more convolutions may be performed to the clean image to generate the spatial background-difference image (e.g., convolution to remove a spatial background). The spatial background-difference image may be analyzed to determine whether candidate space objects are present in the daytime sky captured within the SWIR images by camera system 120.

In some embodiments, the offsets and gains (e.g., PRNU) associated with each pixel for each SWIR sensor 122 may be stored within image processing database 130. For example, the offsets and gains may be predetermined and stored in image processing database 130. Upon determining that one or more of the offsets and/or gains are needed to perform image processing on the stacked image (or a different image), the offsets and/or gains may and retrieved from image processing database 130 and provided to image processing subsystem 114.

In some embodiments, a matched-filter image may be generated based on the spatial-background difference image and a point-source function kernel. To generate, or otherwise obtain, the matched-filter image, a convolution may be performed whereby the spatial background-difference image is convolved with a point-source function kernel. In some embodiments, the point-source function kernel may be a 2D Gaussian function. The point-source function may be used to estimate a point source within the spatial background-difference image. As another example, an Airy function may be used, where the Airy function corresponds to a linearly independent solution of the Airy Equation. In some embodiments, the 2D Gaussian function may be employed as an approximation of the Airy function. The resulting matched-filter image may be used to perform target detection.

Image analysis subsystem 116 may be configured to analyze a resulting matched-filter image to determine whether any candidate space objects are present therein. A candidate space object may refer to a possible celestial body (e.g., an RSO) detected within images of the daytime sky. In some embodiments, image analysis subsystem 116 may be configured to determine whether the matched-filter image includes any candidate space objects. For example, as mentioned above, image analysis subsystem 116 may perform one or more convolutions of the clean image. For example, the clean image may be convolved with a spatial function, a ring, a point-source function, and/or other functions. After the convolutions are performed, spatial background-difference image and/or the matched-filter image may be obtained.

In some embodiments, image analysis subsystem 116 may perform a SNR check using the matched-filter image. Alternatively, image analysis subsystem 116 may perform the SNR check using the spatial background-difference image (e.g., without having any convolutions performed). In some embodiments, the signal of each pixel in the matched-filter image may be divided by a noise factor to obtain a normalized or standardized signal value of each pixel. For example, the signal of each pixel may be divided by the standard deviation of the noise, which may be computed locally or globally for the matched-filter image. In some embodiments, the normalized signal value may be compared to a threshold condition. For example, the threshold condition may be a determination as to whether the SNR of the normalized signal value (e.g., the signal value after being divided by the SNR standard deviation) is greater than a number P. P, for instance, may be any positive number, such as, and without limitation, 1, 2, 2.5, 3, 4, 5, 6, 10, etc.

In some embodiments, image analysis subsystem 116 may determine whether each pixel satisfied the threshold condition. Image analysis subsystem 116 may generate a binary mask representation indicating whether each pixel from the matched-filter image satisfies the threshold condition. For instance, for a given pixel, the binary mask representation may assign a first value to a location in the binary mask corresponding to that pixel if the pixel was determined to have satisfied the threshold condition, and may assign a second value to the location if each pixel that does not satisfy the threshold condition. For example, the first value may be a logical 1 (e.g., TRUE) and the second value may be a logical 0 (e.g., FALSE). Alternatively, the first value may be a logical 0 and the second value may be a logical 1. In some embodiments, candidate space objects may be identified by clustering logical 1 bits from the binary mask.

In some embodiments, target detection subsystem 118 may determine a centroid location of each candidate space object. The centroid location may correspond to an x and y position within the binary mask representation of a center of a cluster. Based on the centroid location, target detection subsystem 118 may determine whether a candidate space object corresponds to a space object (e.g., a satellite). In some embodiments, target detection subsystem 118 may retrieve space object location information from celestial location database 132. The space object location information may indicate, for a given position and orientation of camera system 120, whether any space objects (e.g., satellites) were traveling in the same field of view. If so, then the candidate space object may be identified as a space object. For example, a candidate space object may have a location (X1, Y1) within a binary mask representation, and the location (X1, Y1) may correspond to a particular right ascension and declination. The location (X1, Y1) may include an error correction factor for both dimensions. For example, the location may be determined to be (X1±δx, Y1±δy), where δx is an error correction factor in the x-direction of the binary mask representation and δy is an error correction factor in the y-direction of the binary mask representation. Based on the space object location information retrieved from celestial location database 132, a determination may be that a space object was traveling at that right ascension and declination at a time that camera system 120 captured the SWIR images. Therefore, the candidate space object may be a detection of the space object during daytime hours. In some embodiments, target detection subsystem 118 may generate output data, based on at least one of the spatial background-difference image, the matched-filter image, or the binary mask, as well as observation data potentially indicating which, if any, candidate space objects correspond to space objects. For example, the output data may be an output image including a visual representation of the spatial background-difference image, the candidate space objects, and an indication of any detected space objects of those candidate space objects. Furthermore, in some embodiments, the visual representation may be output by computer system 102 and provided to client device 140 to allow an individual to monitor a location and activity of a given space object during daytime hours.

Figure 2:
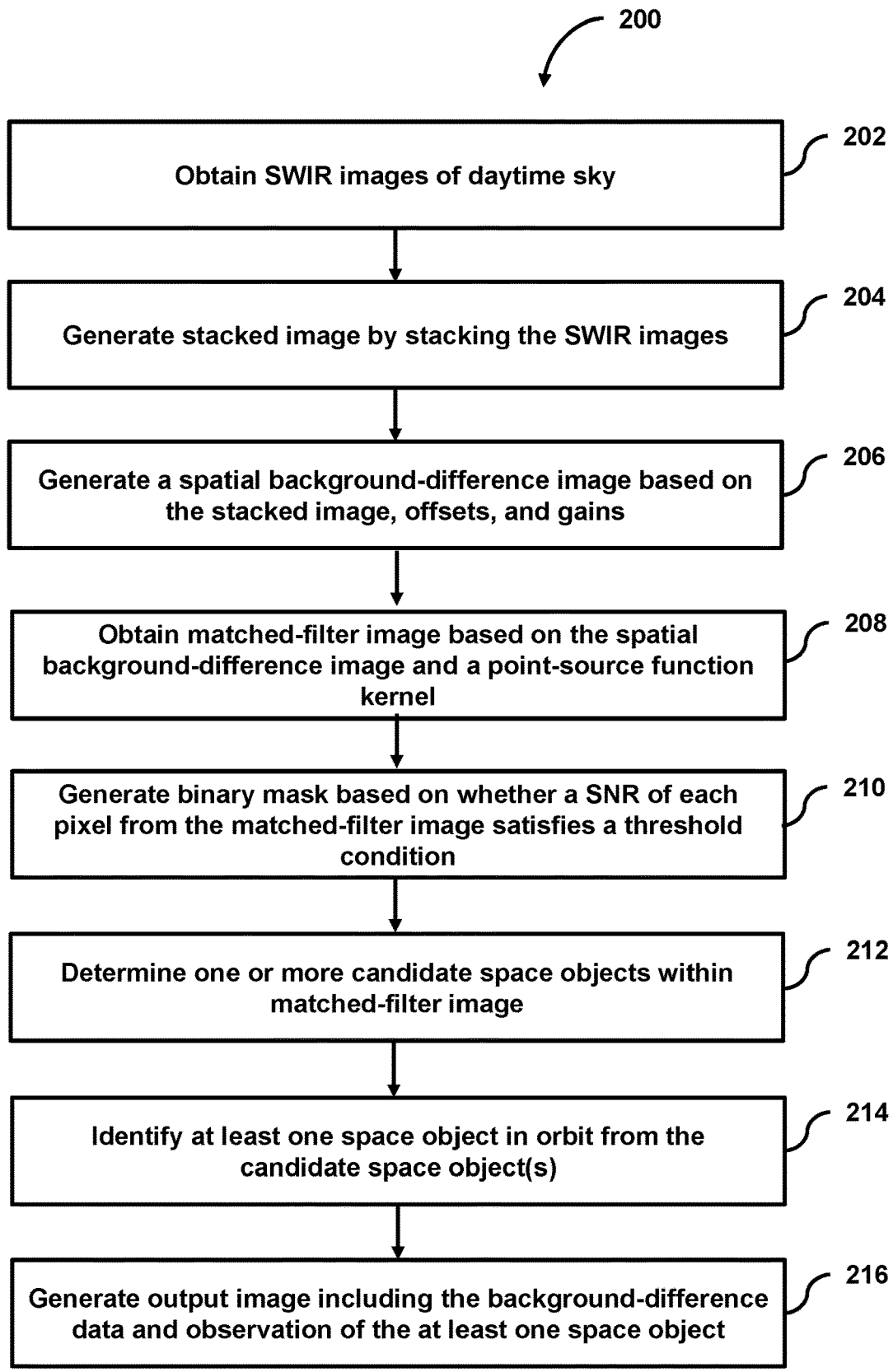
FIG. 2 shows a flowchart of an exemplary process for detecting space objects within SWIR images of daytime sky background, in accordance with various embodiments.

FIG. 2 shows a flowchart of an exemplary process 200 for detecting space objects within SWIR images of daytime sky background, in accordance with various embodiments. In an operation 202, SWIR images of the daytime sky may be obtained. In some embodiments, a plurality of SWIR images may be captured by camera system 120. The SWIR images may be of the daytime sky, which may be captured by directing a telescope or other optical lens elements communicatively coupled to camera system 120 to observe a portion of the sky during daytime hours. As described herein, daytime hours may refer to times during which sun is above a local horizon, or above a particular solar elevation angle, such as 0 or −6 degrees. In some embodiments, camera system 120 may be directed to capture SWIR images of a sky background during non-daytime hours where the sky background may be illuminated such that nighttime image capturing techniques cannot be used. For example, during an aurora or a bright moon time period.

In some embodiments, the SWIR images may be captured at a specified frame rate and for a specified exposure time. The frame rate may indicate a frequency with which camera system 120 is to capture SWIR images or to cause SWIR images to be captured. For example, camera system 120 may have a frame rate (e.g., a frequency for capturing SWIR images) in a range of 100-500 Hz, 500-1,000 Hz, or 100-1,000 Hz, however additional/alternative frame rates may be used. The exposure time may indicate an amount of time that each of SWIR sensors 122 may be exposed to incident light captured by camera system 120 (e.g., via a telescope or optical lens element). For example, SWIR sensors 122 may be configured to have an exposure time equal to or less than 10 ms. In some embodiments, the SWIR images may be continuously captured by camera system 120 and provided to computer system 102 in discrete intervals. For example, the SWIR images may be captured for a 60 second time interval and provided to computer system 102 as a set of SWIR images.

In some embodiments, the SWIR images may be obtained by computer system 102 from camera system 120. The SWIR images may be sent from camera system 120 to computer system 102 via network(s) 150, or the SWIR images may be provided to computer system 102 via a memory/storage device (e.g., a memory card). Furthermore, the SWIR images may be provided with metadata indicating a time when each SWIR image was captured, a geographical position and orientation of camera system 120, filters used by camera system 120 while capturing the SWIR images, exposure times and frame rates used by camera system 120, and/or other information. In some embodiments, operation 202 may be performed by a subsystem that is the same or similar to image collection subsystem 112.

Figure 3:
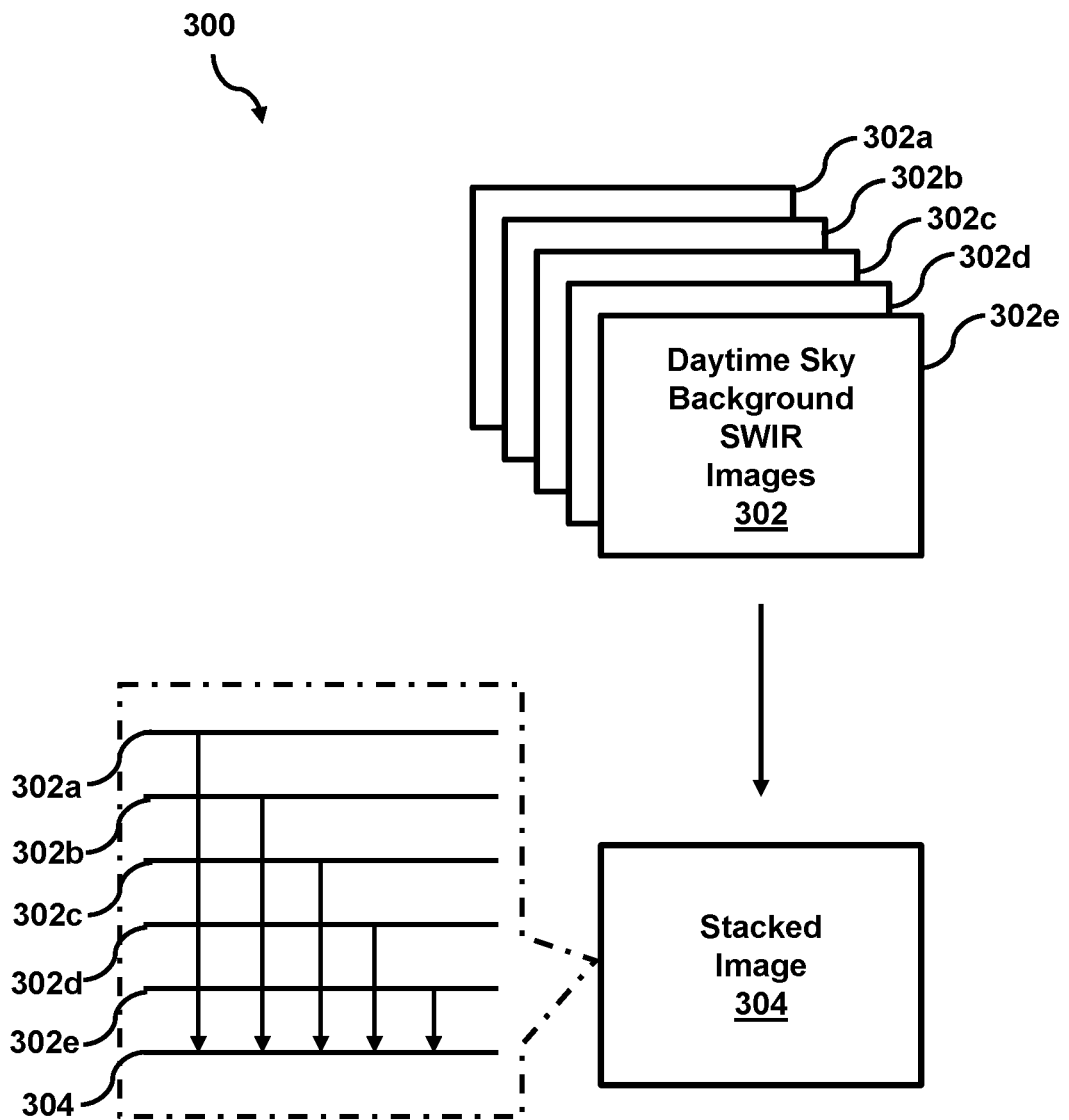
FIG. 3 shows an illustrative diagram of an exemplary process for stacking images, in accordance with various embodiments.

In an operation 204, a stacked image may be generated by stacking the obtained SWIR images of the daytime sky background. Various techniques may be used to generate the stacked image including, but not limited to, averaging or sigma clipping. As an example, with reference to FIG. 3, image stacking process 300 may be used to generate a stacked image 304 from a plurality of daytime sky background SWIR images 302a-302e. In some embodiments, SWIR images 302a-302e, which may collectively be referred to as SWIR images 302, may be obtained from camera system 120. As mentioned previously, camera system 120 may capture SWIR images 302 at a specified frame rate and a specified exposure time. For instance, the frame rate and exposure time may be selected by an individual operating client device 140 or computer system 102, or the frame rate and exposure time may be dynamically selected based on a time of day when the SWIR images are to be captured, a geographical location of camera system 120, historical settings for the frame rate and exposure time, and/or other factors. Each of SWIR images 302 may be stacked together to form stacked image 304. Image stacking may improve a quality of a SWIR image by reducing the variations in value of each pixel in an array of pixels from a set of captured SWIR images. For instance, the stacked image may include, for each pixel of the array of pixels from each SWIR image, a "best pixel value" for the pixel, which may be computed from the set of captured SWIR images.

Figure 4:
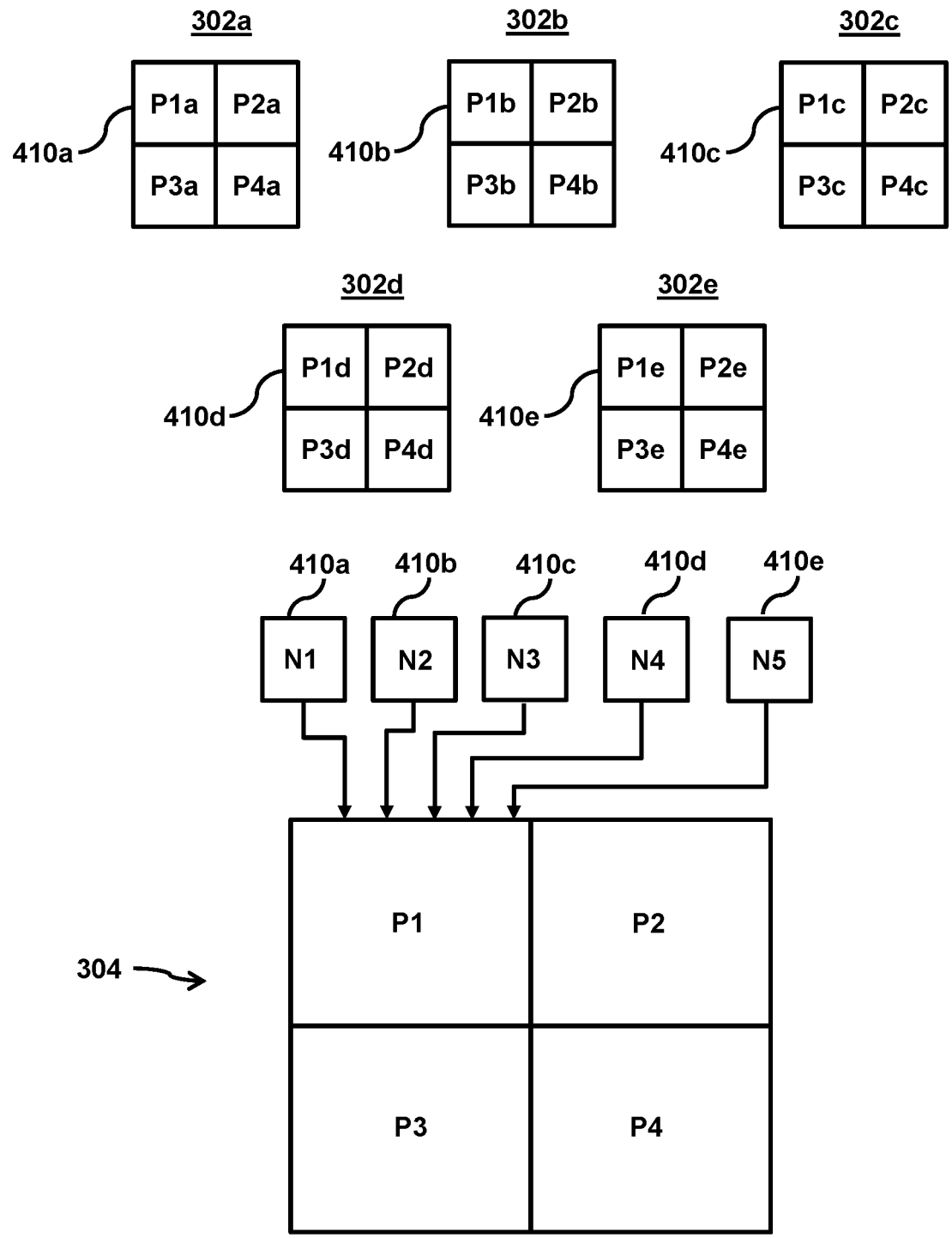
FIG. 4 shows an illustrative diagram of an exemplary process for computing a numerical value for each pixel in an array of pixels to be used for a stacked image, in accordance with various embodiments.

As an example, with reference to FIG. 4, a numerical value for each pixel in an array of pixels to be used for a stacked image. In some embodiments, averaging or sigma clipping may be used to generate the stacked image. Averaging may include obtaining an average numerical value of each pixel of the array of pixels from the set of captured SWIR images. Sigma clipping may include determining the average numerical value including outlier removal. Outlier removal may correspond to a process for removing one or more numerical values for the computation of the average numerical value, where the numerical values that are removed exceed a predetermined number of standard deviations from the average value. For instance, daytime sky background SWIR images 302a-302e may each include an array of pixels. As an example, each of SWIR images 302a-302e may include an array of four pixels: daytime sky SWIR image 302a may include pixels P1a-P4a; daytime sky SWIR image 302b may include pixels P1b-P4b; daytime sky SWIR image 302c may include pixels P1c-P4c; daytime sky SWIR image 302d may include pixels P1d-P4d; and daytime sky SWIR image 302e may include pixels P1e-P4e.

In some embodiments, a numerical value, as described herein, may be associated with each pixel (e.g., pixels P1a-P4a; P1b-P4b; P1c-P4c; P1d-P4d; and P1e-P4e) indicating an intensity of light incident on a corresponding SWIR sensor 122. Some embodiments may include a camera system 120 having four SWIR sensors 122, where a corresponding SWIR sensor 122 is configured to output a numerical value for each pixel of the array of pixels associated with the corresponding SWIR sensor 122 based on the intensity of the incident light (e.g., a number of photons collected by that sensor). To determine the average numerical value for each pixel, the numerical value of each similar pixel from each SWIR image's array of pixels may be computed. For example, an average numerical value of a first pixel, located at a top-left portion of the array of pixels, may be determined by aggregating a numerical value N1 of a first pixel 410a (e.g., pixel P1a) from daytime sky SWIR image 302a, a numerical value N2 of a first pixel 410b (e.g., pixel P1b) from daytime sky SWIR image 302b, a numerical value N3 of a first pixel 410c (e.g., pixel P1c) from daytime sky SWIR image 302c, a numerical value N4 of a first pixel 410d (e.g., pixel P1d) from daytime sky SWIR image 302d, and a numerical value N5 of a first pixel 410e (e.g., pixel P1e) from daytime sky SWIR image 302e, and then dividing by the number of SWIR images (e.g., five). In some embodiments, the average numerical value (e.g., (N1+N2+N3+N4+N5)/5) may be used as a numerical value for a first pixel P1 in stacked image 304.

In some embodiments, instead of using the average numerical value, the average with outlier removal may be used. To determine the average numerical value with outlier removal, also referred to as sigma clipping, the average numerical value and a standard deviation $\sigma$ for each pixel in the array of pixels may be computed. If one or more of the numerical values of a corresponding pixel exceeds a threshold number of standard deviations $\sigma$, that numerical value may be removed from the computation of the average numerical value. For example, if numerical value N1 is greater than $\alpha$ $\sigma$, where $\alpha$ is an integer, then numerical value N1 may not be included in the determination of the average numerical value for the first pixel P1 of stacked image 304. In other words, continuing the aforementioned example, the average numerical value of first pixel P1 excluding numerical value N1 may be equal to (N2+N3+N4+N5)/4. In some embodiments, a may be determined based on the number of SWIR images captured by camera system 120, historical values for a, or randomly. As an example, a may be equal to 2 or 3. Sigma clipping may be performed for each pixel in the array of pixels such that stacked image 304, including pixels P1-P4, may have an average numerical value excluding outliers determined based on the corresponding numerical values of each pixel from daytime sky SWIR images 302a-302e.

In some embodiments, the median deviation and the median absolute deviation may be computed for each row of pixels and column of pixels. If one or more pixels from any of the columns of pixels and rows of pixels are determined to be outliers based on a number of deviations each pixel is from the median deviation of the columns of pixels and/or a number of deviations each pixel of the rows of pixels is from the median deviation of the rows of pixels then these pixels are determined to be outliers. The pixels that are determined to be outliers may be removed from each column of pixels and each row of pixels, and the remaining (e.g., non-excluded) pixels may be averaged together. In some embodiments, the average pixel value for the columns of pixels and the average pixel value for the rows of pixels may be adjusted such that each have a zero-average value, and the adjusted average pixel value for the columns of pixels and the adjusted average pixel value for the rows of pixels may be subtracted from each of the plurality of rows of pixels to obtain the decorrelated value for each pixel of the array of pixels of the stacked image.

Returning to process 200, in an operation 206, a spatial background-difference image may be generated based on the stacked image and the sensors used to capture the SWIR images of the daytime sky background. In some embodiments, the spatial background-difference image may be generated based on the stacked image, one or more offsets, and/or one or more gains. For example, a clean image may be generated from the stacked image by accounting for dark current in SWIR sensors 122, bias frames in the captured SWIR images, the effects of noise within the stacked image, inherent bias in SWIR sensors 122, non-uniformity in photon detection of SWIR sensors 122, vignetting and other optical effects, as well as other aspects.

In some embodiments, dark current and bias values of bias frames may be removed from the stacked image (e.g., stacked image 304). By removing the bias values of the bias frames and accounting for the effects of dark current on each SWIR sensor 122, fixed pattern noise in stacked image 304 may be reduced. Additionally, removing the bias values of the bias frames and accounting for the effects of dark current may also remove extraneous signals in stacked image 304 that are produced by electronics of SWIR sensors 122 and camera system 120. Dark current may be present in most electrical systems. Dark current may correspond to a small amount of electric current that flows through a photon-sensitive device, such as SWIR sensors 122, even in the absence of incident light. The bias frame may correspond to a SWIR image captured by SWIR sensor 122 with no actual exposure time due to unwanted signals present in the electronics of SWIR sensors 122 and camera system 120. In some embodiments, the dark current may be removed by precomputing an amount of signal produced by each of SWIR sensors 122 in the absence of incident light. For example, if a first pixel P1 of an array of pixels of stacked image 304 has a numerical value of N, and the precomputed amount of dark current for one SWIR sensor 122 associated with first pixel P1 is DC1, then the resulting signal level for first pixel P1, accounting for dark current, would be N*=(N−DC1). Additionally, any bias frames detected within daytime sky SWIR images 302 that are used to generate stacked image 304 may also be removed.

In some embodiments, the effect of noise within the stacked image may also be accounted for when generating the clean image. Infrared cameras, such as those included within camera system 120 (e.g., SWIR sensors 122), may produce noise artifacts whereby a particular column of pixels, row of pixels, or both column and row of pixels, may be brighter (or darker) than a neighboring column of pixels, row of pixels, respectively. To ensure that any particular row or column is not producing additive noise to an adjacent row or column, an amount of noise associated with each row and column may be estimated and subtracted from stacked image 304 to assist in obtaining the clean image.

Figure 5:
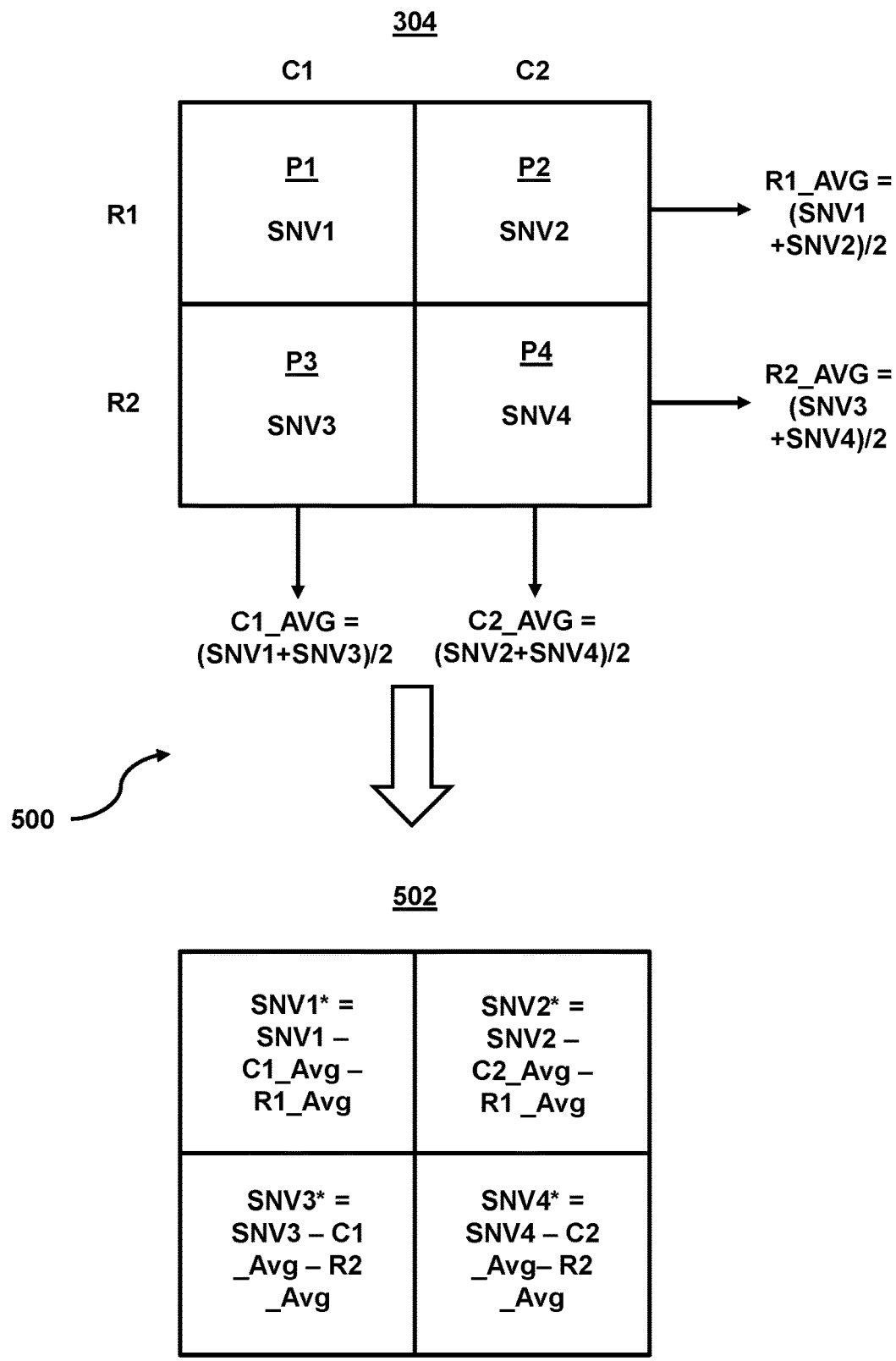
FIG. 5 shows an illustrative diagram of an exemplary process for computing a decorrelated value associated with a pixel, in accordance with various embodiments.

FIG. 5 shows an illustrative diagram of an exemplary process for computing a decorrelated value associated with a pixel, in accordance with various embodiments. In some embodiments, process 500 may include performing sigma clipping techniques (e.g., averaging with outlier removal) for each row of pixels and each column of pixels of the array of pixels of stacked image 304. As seen in FIG. 5, stacked image 304 may include an array of pixels, P1-P4. First pixel P1 may have a stacked numerical value SNV1 (e.g., a numerical value of this pixel from the stacked image), second pixel P2 may have a stacked numerical value SNV2, third pixel P3 may have a stacked numerical value SNV3, and fourth pixel P4 may have a stacked numerical value SNV4. Each of stacked numerical values SNV1-SNV4 may correspond to a number between 0 and 1, however other scales may be used (e.g., a number between 0 and 10, a number between 0 and 100, etc.). The value for a given pixel may indicate an intensity of light incident upon one of SWIR sensors 122 that is associated with the given pixel. For example, SWIR sensors 122 may include an array of SWIR sensors 122, where each SWIR sensor 122 of the array outputs a value for a pixel in an array of pixels. Using a scale of between 0 and 1, if a SWIR sensor 122 outputs a value of 1, this may indicate that a maximum amount of light detectable by SWIR sensor 122 was received. Alternatively, if SWIR sensor 122 outputs a value of 0, this may indicate that a minimum amount of light detectable by SWIR sensor 122 was received.

In some embodiments, the numerical value of each pixel in a given row of pixels, and the numerical value of each pixel in a given column of pixels may be averaged together. For example, stacked image 304 may include four pixels P1-P4 having values SNV1-SNV4, respectively, including two rows of two pixels (e.g., pixels P1 and P2, and pixels P3 and P4) and two columns of two pixels (e.g., pixels P1 and P3, and pixels P2 and P4). While stacked image 304 including four pixels is shown within FIG. 5, any number of pixels may be included within a SWIR image based on the resolution of camera system 120. For example, camera system 120 may have a resolution of 640×512 pixels, 1280×1024 pixels, and the like. For simplicity, stacked image 304 of FIG. 5 is illustrated as having a resolution of 2×2 pixels.

To determine an average numerical value C1_Avg for a first column C1, stacked numerical value SNV1 of first pixel P1 and stacked numerical value SNV3 of third pixel P3 may be aggregated together and divided by the total number of pixel values aggregated together (e.g., two). Similarly, to determine an average numerical value C2_Avg for a second column C1, stacked numerical value SNV2 of second pixel P2 and stacked numerical value SNV4 of fourth pixel P4 may be aggregated and divided by the total number of pixel values aggregated together. A similar procedure may be performed to obtain an average numerical value R1_Avg for a first row R1 and an average numerical value R2_Avg for a second row R2.

In some embodiments, in addition to obtaining the average numerical value for each row of pixels and each column of pixels, a standard deviation of the stacked numerical values from each row of pixels and from each column of pixels may be obtained. Based on the average numerical value of a given row or column and a standard deviation of the same row or column, a determination may be made as to whether any of the numerical values are outliers. If so, those stacked numerical values may be removed from consideration and the average numerical value for a given row and a given column of pixels may be recomputed.

In some embodiments, the recomputed average numerical value for a given row of pixels and a given column of pixels may be subtracted from the stacked numerical value of a corresponding pixel of the array of pixels from stacked image 304 to form a clean image 502. For example, if first pixel P1 has stacked numerical value SNV1, and the average numerical value (after outlier removal) of the first row of pixels R1 and first column of pixels C1 are R1_Avg and C1_Avg, respectively, then the new stacked numerical value for first pixel P1 may be equal to SNV1*=SNV1−R1_Avg−C1_Avg. A similar process may be performed for each pixel of the array of pixels of stacked image 304 to assist in obtaining clean image 502 having numerical values SNV1*-SNV4* for each pixel of the array of pixels. In some embodiments, one or more additional offsets or gains may also be applied to each pixel of stacked image 304 in order to obtain clean image 502. For example, a gain may be applied to some or all of SNV1*-SNV4*.

Figure 6:
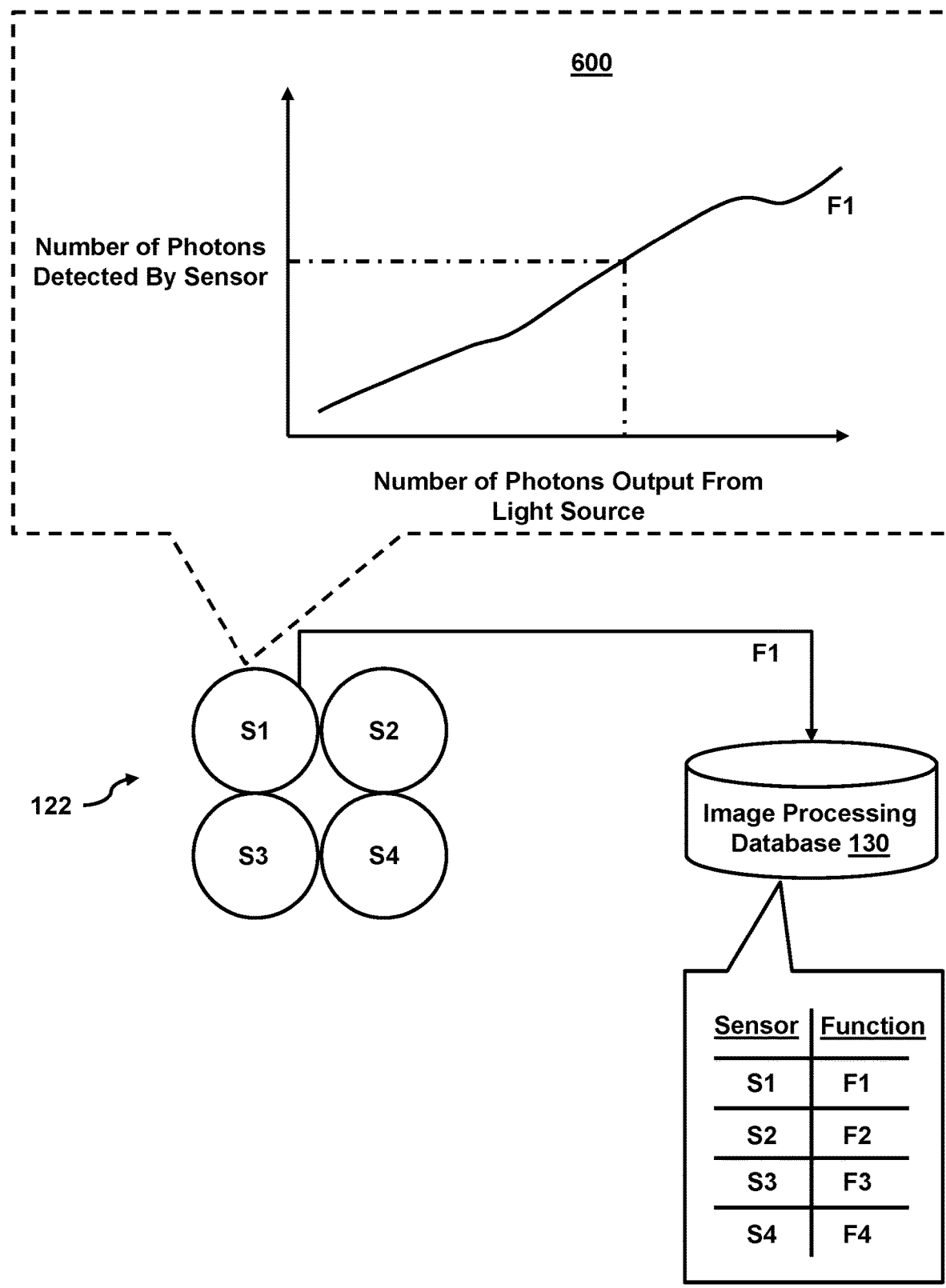
FIG. 6 shows an illustrative diagram of an exemplary process for determining pixel response non-uniformities, in accordance with various embodiments.

FIG. 6 shows an illustrative diagram of an exemplary process for determining a gain value, in accordance with various embodiments. In some embodiments, each of SWIR sensors 122 may be analyzed using a uniform light source to determine a pixel response non-uniformity (PRNU) function associated with that SWIR sensor 122. The PRNU function may be stored in image processing database 130 after being computed and may be used to determine a gain value to apply to a numerical value associated with a given pixel to correct for non-uniformity in that sensor's photon detection.

In some embodiments, SWIR sensors 122 may include four instances of a SWIR sensor 122, represented as sensors S1-S4. However, even if two of SWIR sensors 122 (e.g., sensors S1 and S2) receive a same number of photons, a value for a pixel output by one of SWIR sensors 122 (e.g., sensor S1) may differ from a value for a pixel output by the other one of SWIR sensors 122 (e.g., sensor S2). Additionally, while a first number of photons may have incident one of SWIR sensors 122, a second number of photons may have been registered as a photon count for that sensor. For example, if sensor S1 was incident with 10 photons, sensor S1 would ideally register a count of 10 photons. However, in practice, sensor S1 may register a count of 9 photons, etc.

To address the aforementioned issues, each of SWIR sensors 122 may be analyzed prior to being used to capture SWIR images of the daytime sky. In some embodiments, a uniform light source may be obtained. The uniform light source may have a variable intensity that can be controlled by computer system 102. As an example, the uniform light source may be an LED light of a particular wavelength. Light output by the uniform light source may be directed to each of SWIR sensors 122 (e.g., sensors S1-S4), and a number of photons detected by each of SWIR sensors 122 may be determined. In some embodiments, a mapping function indicating a relationship between a number of photons of the light output by the uniform light source and the number of photons detected by each of SWIR sensors 122 may be generated. For example, graph 600 may illustrate an example mapping function F1 (e.g., a monotonically increasing function) indicating a relationship between a number of photons output from a uniform light source and a number of photons detected by a sensor (e.g., sensor S1). In some embodiments, the mapping function associated with each SWIR sensors 122 (e.g., sensors S1-S4) may be stored within image processing database 130. For instance, mapping function F1 may have been generated based on determined characteristics of sensor S1; mapping function F2 may have been generated based on characteristics of sensor S2; mapping function F3 may have been generated based on characteristics of sensor S3; and mapping function F4 may have been generated based on characteristics of sensor S4.

In some embodiments, for a given numerical value of a pixel, a gain value for that pixel may be derived from a mapping function of a sensor associated with that pixel. As an example, computer system 102 may retrieve mapping function F1 from image processing database 130 for sensor S1. Based on mapping function F1, a determination may be made of a gain value for sensor S1 to account for the sensor's PRNU response. For instance, if a numerical value for sensor S1 is determined to be NV, mapping function F1 may indicate that when sensor S1 registers a value NV, this really corresponds to NV*. Therefore, the gain value may be determined based on a difference between NV and NV*.

In some embodiments, a numerical value for each pixel of an array of pixels of a clean image may be generated by accounting for the one or more offsets and the one or more gains. For example, a numerical value for a pixel of the array of pixels of the clean image may be computed by subtracting the dark current value for the pixel, the average numerical value of the column of the given pixel, and the average numerical value of the row of the given pixel from the stacked numerical value, and then multiplying this difference by the gain value for the given pixel. For example, for a stacked numerical value $SNV\_i$, where i represents a number of pixels in an array of pixels of stacked image 304, a clean image numerical value $BP\_i$ of the i-th pixel may be equal to:

$$BP_i = (SNV_i - DC_i - C_{Avg_i} - R_{Avg_i}) Gain_i \qquad \text{Equation 3.}$$

In some embodiments, generating the clean image may further include mitigating faulty pixel artifacts, as well as accounting for vignetting and stray light from internal reflections from optical lens elements of camera system 120. The vignetting effect may correspond to a phenomenon whereby an image appears brighter in the center than towards the edges. The stray light from internal reflections may occur due to dust or other contaminants that build up within camera system 120 over time that reflect light into SWIR sensors 122. To correct for the vignetting effect and the stray light, optical flat field correction may be used. In some embodiments, optical flat field correction removes artifacts from SWIR images to improve image quality. As an example, optical flat field correction for each pixel may computed using Equation 4:

$$C_i = \frac{(R_i - DC_i)}{(F_i - DC_i)/(\overline{F - DC})}.$$  Equation 4

In Equation 4, $C_i$ represents a frame corrected by a flat field for the i-th pixel, $R_i$ represents a numerical value of the i-the pixel of a raw frame, $DC_i$ represents a value of the i-th pixel of a master dark frame, and $F_i$ represents a numerical value of the i-th pixel of a flat field frame. The denominator may also be referred to "a flat field correction." To determine the master dark frame, an average of a number of dark frames of equal duration and temperature to that of the raw frame may be computed. In some embodiments, the artifacts associated with a given pixel may be corrected using that pixels corresponding flat field correction. For example, applying the flat field correction may include dividing a value of the flat field correction for a given pixel by a numerical value for that pixel. In some embodiments, the flat field correction for each pixel may be continually computed and used to correct for artifacts that may be present (e.g., every few minutes). In some embodiments, the flat fields are corrected with a same average column and row numerical value being removed, and same gain value (e.g., PRNU) applied for a given pixel prior to being divided as the flat field correction.

In some embodiments, the clean image may be used to generate a spatial background-difference image. For instance, one or more convolutions may be performed with the clean image, whose output may be the spatial background-difference image, as described in greater detail with respect to FIG. 7. The spatial background-difference image may also include an array of pixels, each of which having a background-difference numerical value determined based on the convolution of a corresponding pixel from the clean image with a kernel. In some embodiments, operation 206 may be performed by a subsystem that is the same or similar to image processing subsystem 114.

Figure 7:
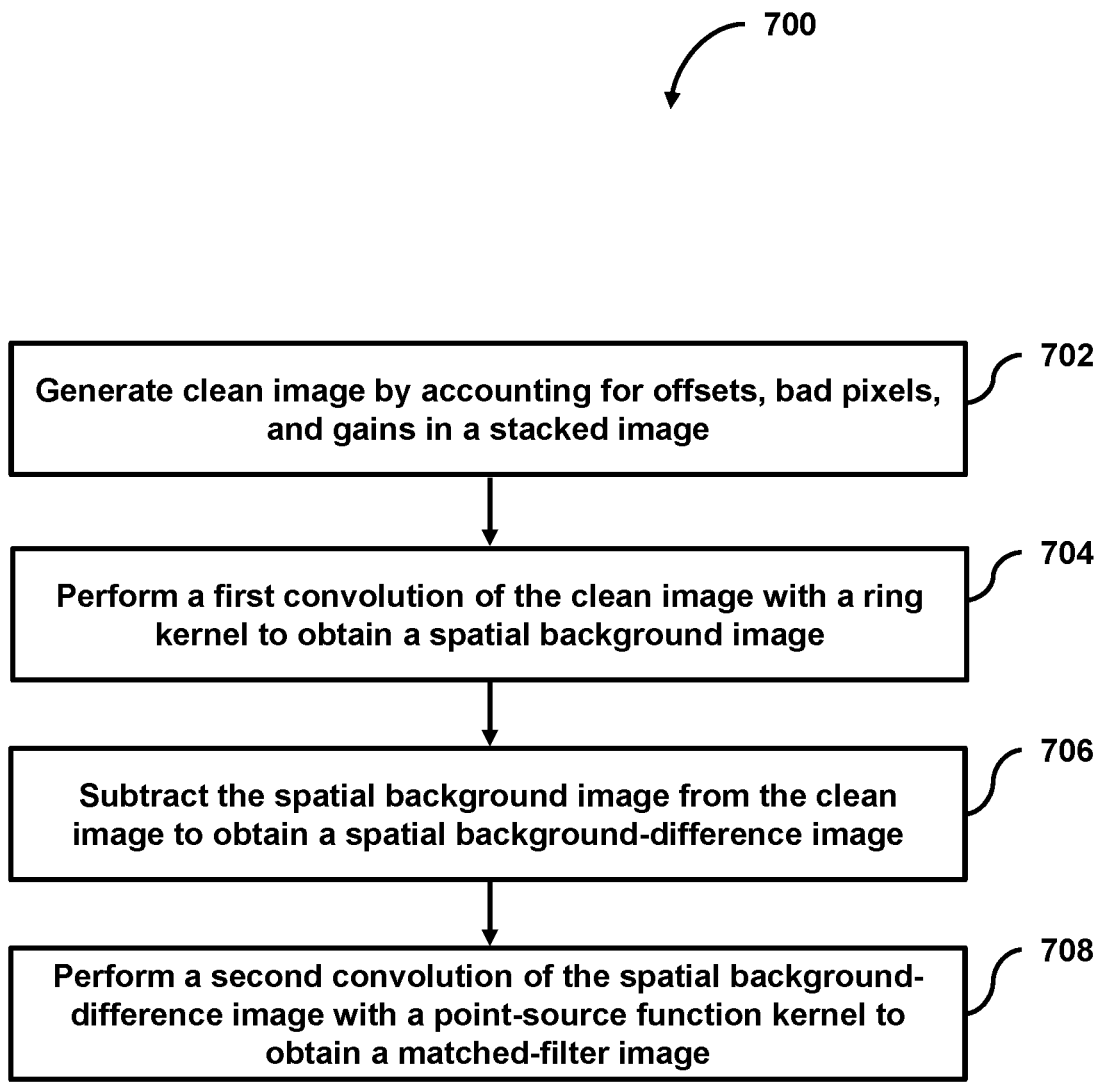
FIG. 7 shows a flowchart of an exemplary process for obtaining a spatial background-difference image, in accordance with various embodiments.

FIG. 7 shows a flowchart of an exemplary process 700 for obtaining a spatial background-difference image, in accordance with various embodiments. In an operation 702, a clean image may be generated by accounting for offsets, bad pixels, and gains in a stacked image. In some embodiments, a stacked image and one or more offsets and gains to be applied to the stacked image may be obtained. For example, stacked image 304 may be obtained as a result of an image stacking process being performed to SWIR images 302. The one or more offsets or gains may be obtained from image processing database 130 and/or computed using computer system 102. As an example, the offsets may include a pixel's dark current value, a correlated (e.g., row/column) noise value, etc., and the gains may include a pixels PRNU response.

In some embodiments, the clean image may be generated by performing a number of sub-steps. For instance, a pre-computed dark frame (e.g., for SWIR sensors 122) may be obtained and subtracted from the stacked image to obtain a dark frame-subtracted image. Next, additive column and row noise values may be estimated and removed from the stacked image. For example, as seen above with respect to FIG. 4 and Equation 3, the additive column and row noise values may be removed from each pixel of the array of pixels of the stacked image to obtain a decorrelated value. In some embodiments, flat field correction is performed by accounting for PRNU in the stacked image (e.g., applying the gain), as well as by removing any optical vignetting and/or dust collection artifacts. In some embodiments, after the offsets and gains have been accounted for, bad pixels may be detected within the resulting image, and clusters of the bad pixels may be flagged to be masked from the detection process. In some embodiments, the bad pixels may be corrected (if it is possible to correct those pixels). If certain bad pixels are unable to be corrected, those pixels may be set to have a numerical value equal to 0. Furthermore, the image having the offsets and gains accounted for, and the bad pixels fixed or set to 0, may be used to generate a spatial lowpass version of that image. Using the spatial lowpass version of the image, the bad pixels that were flagged may be replaced with the values of the corresponding pixels from the spatial lowpass version of the image. The resulting image may be referred to as the clean image. In some embodiments, operation 702 may be performed by a subsystem that is the same or similar to image processing subsystem 114.

In an operation 704, a first convolution of the clean image with a ring kernel may be performed to obtain a spatial background image. A convolution is a mathematical process whereby a first function is modified by a second function to obtain a third function. The first convolution may also be referred to herein as a spatial convolution. The ring kernel may correspond to a ring function that is applied to each pixel of the array of pixels of the clean image. In some embodiments, the ring kernel may be applied to the clean image to form an estimate of the background from the clean image, which may be referred to as a spatial background estimation. In some embodiments, operation 704 may be performed by a subsystem that is the same or similar to image processing subsystem 114.

In an operation 706, the spatial background image may be subtracted from the clean image to obtain a spatial background-difference image. The spatial background-difference image may depict the clean image having the estimated background removed. For instance, each pixel of the spatial-background image may have a background-difference numerical value computed by subtracting a spatial background numerical value of a corresponding pixel of the spatial background image from the numerical value of a corresponding pixel of the clean image. In some embodiments, operation 706 may be performed by a subsystem that is the same or similar to image processing subsystem 114.

In an operation 708, a second convolution may be performed of the spatial background-difference image with a point-source function kernel to obtain a matched-filter image. The point-source function kernel may be a 2D Gaussian function. The point-source function may be used to estimate a point source within the spatial background-difference image. As an example, an Airy function may be used, where the Airy function corresponds to a linearly independent solution of the Airy Equation. As another example, a 2D Gaussian function may be employed as an approximation of the Airy function. The resulting matched-filter image may be used to perform target detection. In some embodiments, operation 708 may be performed by a subsystem that is the same or similar to image analysis subsystem 116.

Returning to FIG. 2, in an operation 208, the matched-filter image may be obtained based on the spatial background-difference image and a point-source function kernel. For example, as detailed above with respect to operation 708 of FIG. 7, a convolution of the spatial background-difference image may be performed with a point-source function kernel to obtain the matched-filter image. The resulting matched-filter image may be used to perform target detection. In some embodiments, operation 208 may be performed by a subsystem that is the same or similar to image analysis subsystem 116.

In an operation 210, a binary mask may be generated based on whether a SNR of each pixel from the matched-filter image satisfies a threshold condition. As mentioned previously, the SNR is defined as the ratio of signal to the standard deviation of the noise. In some embodiments, the SNR for each pixel of the array of pixels of the matched-filter image may be determined. To do so, in some embodiments, the numerical value of each pixel in the array of pixels may be divided by the standard deviation of the image, which may be computed locally or globally. For example, a local standard deviation may be performed by computing a standard deviation of a ring of pixels surrounding a given pixel of the array of pixels from the matched-filter image. For every pixel in the array of pixels of the matched-filter image, there is a standard deviation representing an amount of noise locally surrounding that pixel. In some embodiments, a radius of the ring with which the localized standard deviation is computed for may be a 20 pixel radius, 30 pixels, 40 pixels, 50 pixels, etc. In some embodiments, a process may be performed to find the standard deviation in multiple blocks across the matched-filter image. This process may include fitting a spline and/or smoothing function across the image to obtain an estimate of the local standard deviation for each pixel. The standard deviation for a pixel may be interpolated from the fitted spline/smoothing function.

In some embodiments, a determination may be made as to whether the SNR satisfies a threshold condition. For example, the determination may be as to whether the SNR is equal to or greater than a threshold value. The threshold value may be a number such as 1, 2, 3, 4, 5, 6, etc. The greater the SNR, the stronger the signal is said to be for a given pixel. The lower the SNR, the weaker the signal is said to be with respect to the noise.

In some embodiments, a binary mask may be generated, where the binary mask includes logical 1s and logical 0s (e.g., TRUE, FALSE) indicating whether a pixel's SNR satisfies the threshold condition. As described herein, an image of the binary mask may be referred to as a binary mask representation. As an example, with reference to FIG. 8A, a binary mask representation 800 is illustrated including an array of 1s and 0s representative of individual pixels from the matched-filter image that satisfy and don't satisfy the threshold condition, respectively. In some embodiments, if a first pixel has a SNR that satisfies the threshold condition, then that pixel may be assigned a logical 1 in a binary mask representing the matched-filter image. As another example, if a second pixel has a SNR that does not satisfy the threshold condition, then that pixel may be assigned a logical 0 in the binary mask representing the matched-filter image. The binary mask may have a same number of bits as pixels in the matched-filter image's array of pixels. For example, if the array of pixels in the matched-filter image includes 1280×1024 pixels, then the binary mask may include 1280×1024 (binary) bits (e.g., 1s or 0s). In some embodiments, the number of pixels 802 in binary mask representation 800 that satisfy the threshold condition (e.g., logical 1s) may be less than the number of pixels 804 that do not satisfy the threshold condition (e.g., logical 0s).

As another example, with reference to FIG. 8B, a binary mask representation 850 may be generated. Binary mask representation 850 may differ from binary mask representation 800 in that, instead of including pixels 802 representing logical 1s and pixels 804 representing logical 0s, binary mask representation 850 may include blocks of light regions 852 and blocks of dark regions 854. Light regions 852 may be similar to pixels 802 in that each light region 852 may represent a pixel having a SNR that satisfies the threshold condition. Dark regions 854 may be similar to pixels 804 in that each dark region 854 may represent a pixel having a SNR that does not satisfy the threshold condition. In some embodiments, operation 210 may be performed by a subsystem that is the same or similar to image analysis subsystem 116.

In an operation 212, one or more candidate space object within the matched-filter image may be determined. In some embodiments, clusters of pixels having an SNR that satisfies the threshold condition may be identified via the second convolution used to create this matched-filter image (e.g., the convolution of the spatial background-difference image and the point-source function kernel). The matched-filter image may include a clearer depiction, if possible, of a target point source.

Figure 9:
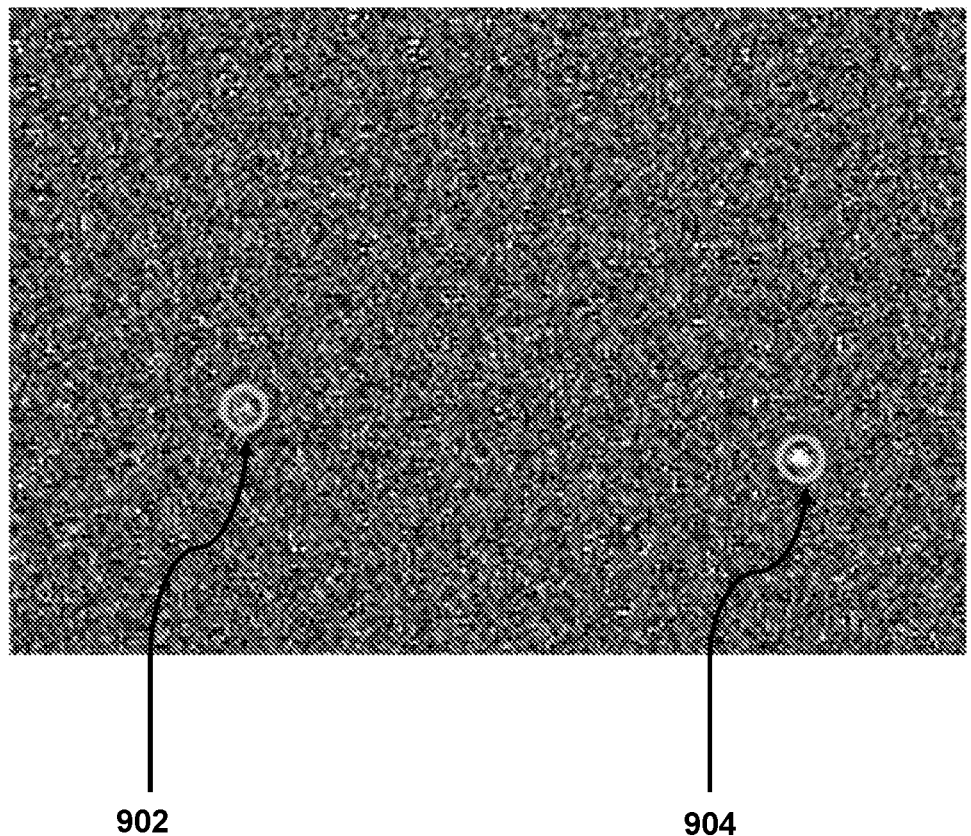
FIG. 9 shows an illustrative diagram of one or more candidate space objects detected within an image, in accordance with various embodiments.

In some embodiments, the candidate space objects may be identified from the clusters of pixels. For example, a detection image generated by thresholding the matched-filter image may be used to determine whether any candidate space objects are present. As an example with reference to FIG. 9, detection image 900 may be generated by overlaying detections (represented by green circles) found through thresholding the matched-filter image (e.g., binary mask representation 800) on top of the spatial background-difference frame. As seen in detection image 900, candidate space objects 902 and 904 may be identified. Candidate space objects may represent portions of a binary mask representation that include a collection of pixels satisfying the threshold condition. In some embodiments, operation 212 may be performed by a subsystem that is the same or similar to image analysis subsystem 116.

In an operation 214, at least one space object in orbit may be identified from the candidate space objects. The at least one space object in orbit may be detected based on one or more confidence measures used to determine whether a detected candidate space object is not a false positive. Confidence measures may refer to one or more filters that may be applied to the data indicating detected candidate space objects, which may be used to verify which candidate space objects are space objects in orbit. For example, one confidence measure may be determining whether any of the candidate space objects correspond to known space objects in orbit using space object location information obtained from celestial location database 132. The space object location information may indicate RSOs (e.g., satellites) that are expected to be within a field of view (FOV) of camera system 120 during a time period when the SWIR images were captured. As mentioned above, the SWIR images captured by camera system 120 may include metadata indicating a times when the SWIR images were captured and geographical location and orientation information regarding where camera system 120 is located and how it is positioned (e.g., a portion of the sky being observed). Based on the metadata, celestial location database 132 may be queried to retrieve information indicating RSOs expected to be in that portion of the sky during the times the SWIR images were captured. For example, if the SWIR images were captured between times T1 and T2, and camera system 120 was directed at a portion FOV1 of the sky (e.g., right ascension and declination values), then computer system 102 may retrieve space object location information for those times and that portion of the sky. In some embodiments, operation 212 may be performed by a subsystem that is the same as or similar to target detection subsystem 118.

Figure 10:
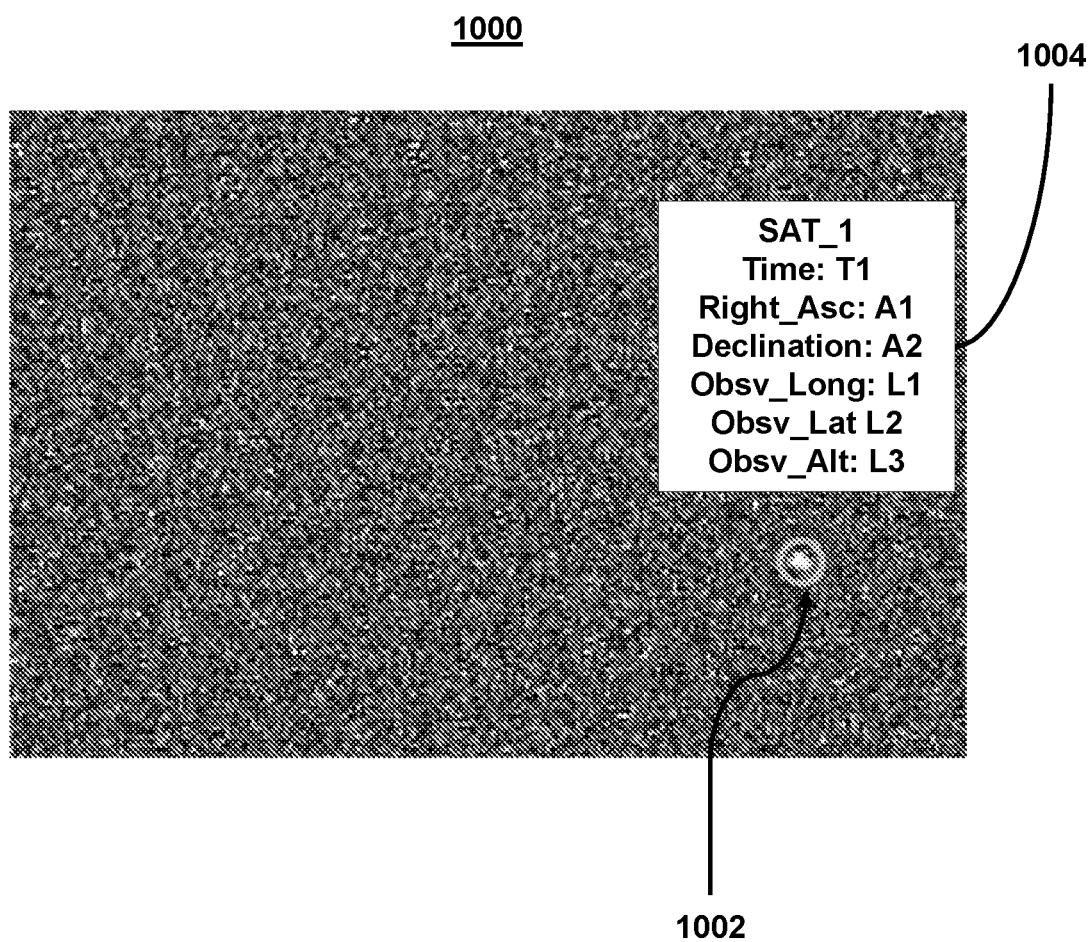
FIG. 10 shows an illustrative diagram of an exemplary visual representation including an identified space object, in accordance with various embodiments.

In an operation 216 an output image (including the background-difference data) and an observation of at least one space object may be generated. In some embodiments, the output data may include an image or other visual representation including confirmed targets, as well as, or alternatively, information regarding the identified RSOs. As an example, with reference to FIG. 10, output image 1000 may include space object 1002. Output image 1000 may, for example, be similar to detection image 900 that included candidate space objects 902 and 904. However, as seen by output image 1000, candidate space object 904 may be identified, based on space object location information, as being space object 1002. For example, space object 1002 may be an RSO, such as a satellite. Furthermore, candidate space object 902 may have been determined to not have been an RSO based on the space object location information. Therefore, candidate space object 902 may not be included within output image 1000. In some embodiments, output image 1000 may also include observation information 1004 displayed within output image 1000. Observation information 1004 may include, for example, a name or identifier associated with the identified RSO, a time or time period during which the RSO was detected, a set of angles pointing to the identified RSO, and a longitude, latitude, and altitude of the camera system 120 when the SWIR images were captured including the identified RSO. For example, observation information 1004 may indicate that identified space object 1002 has an identifier SAT_1, and was identified at a time T1 at a right ascension A1 and declination A2 from an observing longitude L1, latitude L2, and altitude L3. In some embodiments, however, no space objects may be detected based on the space object location information and the candidates space objects. In this scenario, the output data may indicate that only uncorrelated candidate space objects were detected within the initially captured SWIR images. Likewise, in some embodiments, no candidate space objects may be detected, which itself may be valuable information when a space object is expected. In some embodiments, operation 216 may be performed by a subsystem that is the same as or similar to target detection subsystem 118.

In some embodiments, the various computers and subsystems illustrated in FIG. 1 may include one or more computing devices that are programmed to perform the functions described herein. The computing devices may include one or more electronic storages (e.g., prediction database(s) 132, which may include user data database(s) 134, content database(s) 136, profile database(s) 138, etc., or other electronic storages), one or more physical processors programmed with one or more computer program instructions, and/or other components. The computing devices may include communication lines or ports to enable the exchange of information with one or more networks (e.g., network(s) 150) or other computing platforms via wired or wireless techniques (e.g., Ethernet, fiber optics, coaxial cable, WiFi, Bluetooth, near field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically stores information. The storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 112-118 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 112-118 described herein is for illustrative purposes, and is not intended to be limiting, as any of subsystems 112-118 may provide more or less functionality than is described. For example, one or more of subsystems 112-118 may be eliminated, and some or all of its functionality may be provided by other ones of subsystems 112-118. As another example, additional subsystems may be programmed to perform some, or all of the functionality attributed herein to one of subsystems 112-118.

Although the present application has been described in detail for the purpose of illustration based on what is currently considered to be the most practical and preferred embodiments, it is to be understood that such detail is solely for that purpose and that the application is not limited to the disclosed embodiments, but, on the contrary, is intended to cover modifications and equivalent arrangements that are within the scope of the appended claims. For example, it is to be understood that the present application contemplates that, to the extent possible, one or more features of any embodiment can be combined with one or more features of any other embodiment.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the context clearly indicates otherwise. Thus, for example, reference to "an element" or "a element" includes a combination of two or more elements, notwithstanding use of other terms and phrases for one or more elements, such as "one or more." The term "or" is non-exclusive (i.e., encompassing both "and" and "or"), unless the context clearly indicates otherwise. Terms describing conditional relationships, (e.g., "in response to X, Y," "upon X, Y," "if X, Y," "when X, Y,") and the like, encompass causal relationships in which the antecedent is a necessary causal condition, the antecedent is a sufficient causal condition, or the antecedent is a contributory causal condition of the consequent, (e.g., "state X occurs upon condition Y obtaining" is generic to "X occurs solely upon Y" and "X occurs upon Y and Z."). Such conditional relationships are not limited to consequences that instantly follow the antecedent obtaining, as some consequences may be delayed, and in conditional statements, antecedents are connected to their consequents, (e.g., the antecedent is relevant to the likelihood of the consequent occurring). Statements in which a plurality of attributes or functions are mapped to a plurality of objects (e.g., one or more processors performing steps/operations A, B, C, and D) encompasses both all such attributes or functions being mapped to all such objects and subsets of the attributes or functions being mapped to subsets of the attributes or functions (e.g., both all processors each performing steps/operations A-D, and a case in which processor 1 performs step/operation A, processor 2 performs step/operation B and part of step/operation C, and processor 3 performs part of step/operation C and step/operation D), unless otherwise indicated. Further, unless otherwise indicated, statements that one value or action is "based on" another condition or value encompass both instances in which the condition or value is the sole factor and instances in which the condition or value is one factor among a plurality of factors. Unless the context clearly indicates otherwise, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, (e.g., with explicit language like "after performing X, performing Y,") in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless the context clearly indicates otherwise, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

The present techniques will be better understood with reference to the following enumerated embodiments:

1. A system for detecting space objects, the system comprising: a computer system comprising one or more processors configured to execute one or more computer program instructions that, when executed by the one or more processors, effectuate operations comprising: generating a background-difference image based on a plurality of images of daytime sky captured by a ground-based camera system responsive at least to infrared light; generating a matched-filter image based on the background-difference image and a kernel, wherein the matched-filter image comprises an array of pixels each having a corresponding pixel value; selecting one or more pixels from the array of pixels based on a respective signal intensity of the corresponding pixel value in the matched-filter image; generating at least one cluster having one or more pixel location of each of the selected one or more pixels; detecting at least one space object based on the at least one cluster; and generating, based on the detecting, output data indicating that at least one space object has been detected.

2. The system of embodiment 1, wherein: the camera system comprises: one or more shortwave infrared (SWIR) sensors; and one or more thermoelectric coolers (TECs).

3. The system of embodiment 1 or 2, wherein the operations further comprise: generating a stacked image by stacking the plurality of images, the plurality of images corresponding to a plurality of seconds of imaging of the sky by the camera system.

4. The system of any one of embodiments 1-3, wherein generating the background-difference image comprises: generating a first image by adjusting the stacked image to account for one or more offsets and gains; and performing a convolution of the first image with a ring kernel to obtain the background image, wherein the background-difference image is generated by determining a difference between a second image and the first image.

5. The system of any one of embodiments 1-4, wherein generating the matched-filter image comprises: performing a convolution of the background-difference image with a point-source function kernel.

6. The system of any one of embodiments 1-5, wherein the operations further comprise: determining one or more candidate space objects within the matched-filter image based on the mask, wherein the at least one space object is detected from the one or more candidate space objects, and wherein the mask is a binary mask.

7. The system of any one of embodiments 1-6, wherein generating the output data comprises: generating an output image comprising the background-difference image and the observation of the at least one space object.

8. The system of any one of embodiments 1-7, comprising: means for detecting space objects within shortwave infrared (SWIR) images of daytime sky.

9. The system of any one of embodiments 1-8, wherein the operations comprise: steps for detecting space objects within SWIR images of daytime sky background.

10. The system of any one of embodiments 1-9, wherein the operations comprise: steps for stacking images.

11. The system of claim 1, wherein the operations comprise: steps for computing a numerical value for each pixel in an array of pixels to be used for the stacked image.

12. The system of any one of embodiments 1-11, wherein the operations comprise: steps for computing a decorrelated value associated with a pixel.

13. The system of any one of embodiments 1-12, wherein the operations comprise: steps for determining pixel response non-uniformities.

14. The system of any one of embodiments 1-13, wherein the operations comprise: steps for obtaining a background-difference image.

15. The system of any one of embodiments 1-14, wherein the operations comprise: steps for normalizing signal to noise ratios to a wavelength.

16. The system of any one of embodiments 1-15, wherein the operations comprise: steps for convolving the background-difference image with a point-source function kernel.

17. The system of any one of embodiments 1-16, wherein the camera system: is configured to maintain dark currents less than or equal to 100 kilo-electrons per pixel per second; is configured to capture images with a framerate greater than 100 Hz; and comprises an optical train having one or more lowpass filters having cutoff wavelengths selected between 0.9-1.7 microns and one or more infrared polarizers.

18. The system of any one of embodiments 1-17, wherein the ground-based camera system is responsive to wavelengths between 1.0-1.7 microns 19. One or more non-transitory computer readable media comprising computer program instructions that, when executed by one or more processors, effectuate operations comprising: obtaining a stacked image based on images of daytime sky, wherein the images are obtained from a camera system comprising one or more sensors responsive at least to infrared light; selecting one or more pixels from an array of pixels included in the stacked image based on a respective signal intensity of a corresponding pixel value for each of the selected one or more pixels; generating at least one cluster having one or more pixel location of each of the selected one or more pixels; and generating, based on the one or more clusters, output data that indicates whether a space object has been detected.

20. The one or more media of embodiment 19, wherein the images are shortwave infrared (SWIR) images, the camera system is ground-based, and the operations further comprise: generating a background-difference image based on the stacked image; and generating a matched-filter image based on the background-difference image, wherein the mask is generated based on the matched-filter image.

21. The one or more media of embodiment 20, wherein the output data is generated further based on the background-difference image.

22. The one or more media of any one of embodiments 19-21, wherein the operations further comprise: generating a transformed first image based on the stacked image; performing a first convolution based on the first image and a ring kernel to obtain a background image; and generating a background-difference image by removing the background image from the transformed image, wherein the output data is generated further based on the background-difference image.

23. The one or more media of embodiment 22, wherein the operations further comprise: performing a second convolution based on the background-difference image and a point-source function kernel to obtain a matched-filter image, wherein: the binary mask is generated further based on the matched-filter image, candidate space objects are detected based on the matched-filter image, and the output data indicates whether the space object has been detected based on the candidate space objects.

24. The one or more media of embodiment 23, wherein generating the output data comprises: retrieving, based on a location of the camera system when the images were captured, space object location information indicating a plurality of space objects; and determining that at least one of the candidate space objects is a space object based on at least one confidence measure indicating that the at least one of the candidate space objects is not a false positive, wherein the output data comprises an indication of the space object.

25. The one or more media of embodiment 20, wherein the stacked image comprises an array of pixels, each pixel of the array of pixels has a stacked numerical value, the camera system comprises one or more sensors responsive to light having a wavelength of 1 micron, and the operations further comprise: generating a first image based on the stacked image, one or more offsets, and one or more gains.

26. The one or more media of embodiment 25, wherein sensors include one or more short-wave infrared sensors (SWIR), the operations further comprise: obtaining a bias value associated with each SWIR sensor of the one or more SWIR sensors, wherein the one or more offsets comprise the bias value, and wherein the stacked numerical value of each pixel of the array of pixels of the stacked image is adjusted based on the bias value associated with the pixel.

27. The one or more media of embodiment 25 or 26, further comprising: obtaining a correlated noise value associated with each pixel of the array of pixels, wherein the stacked numerical value of each pixel of the array of pixels of the stacked image is adjusted based on the correlated noise value associated with the pixel.

28. The one or more media of any one of embodiments 25-27, further comprising: determining, based on a precomputed function representing pixel response non-uniformity (PRNU) of each sensor of the one or more sensors, a gain value of each pixel of the array of pixels of the stacked image, wherein the one or more gains comprise the gain value, and wherein the stacked numerical value of each pixel of the array of pixels of the stacked image is adjusted based on the gain value associated with the pixel.

29. The one or more media of any one of embodiments 19-28, wherein the camera system further comprises one or more thermoelectric coolers (TECs).

30. The one or more media of any one of embodiments 19-29, wherein generating the output data comprises: generating an output image comprising a background-difference image and an observation of the space object.

31. A method implemented by one or more processors configured to execute one or more computer program instructions that, when executed by the one or more processors, perform the method, the method comprising: generating, with a computer system, a stacked image by stacking images of daytime sky indicative of intensity of light in a range of wavelengths that includes light having a wavelength of 1 micron, wherein the images are obtained from a camera system comprising one or more sensors; selecting, with the computer system, one or more pixels from an array of pixels included in the stacked image based on a respective signal intensity of a corresponding pixel value for each of the selected one or more pixels; generating, with the computer system, at least one cluster having one or more pixel location of each of the selected one or more pixels; and generating, with the computer system and based on the at least one cluster, output data based that indicates whether a space object has been detected.

32. One or more tangible, non-transitory, machine-readable media comprising computer program instructions that, when executed by one or more processors, effectuate operations comprising the method of any one of embodiments 1-18.

33. A system, comprising: a camera system and a computer system, wherein the computer system comprises one or more processors configured to execute one or more computer program instructions such that, when executed, the one or more processors are configured to effectuate operations comprising the method of any one of embodiments 1-18.

What is claimed is:

1. A system for detecting space objects, the system comprising:
a computer system comprising one or more processors configured to execute one or more computer program instructions that, when executed by the one or more processors, effectuate operations comprising:
generating a stacked image by stacking a plurality of images that correspond to a plurality of seconds of daytime sky imaged by a ground-based camera system that is responsive at least to infrared light;
generating (i) a first image based on the stacked image and (ii) a second image by performing a convolution of the first image;
generating a background-difference image by determining a difference between the second image and the first image;
generating a matched-filter image based on the background-difference image, wherein the matched-filter image comprises an array of pixels;
selecting one or more pixels from the array of pixels based on a signal intensity of one or more corresponding pixel values of the one or more pixels in the matched-filter image;
generating at least one cluster having one or more pixel locations of each of the one or more pixels;
detecting at least one space object based on the at least one cluster; and
generating, based on detecting the at least one space object, output data indicating that the at least one space object has been detected.

2. The system of claim 1, wherein:
the camera system comprises:
one or more shortwave infrared (SWIR) sensors; and
one or more thermoelectric coolers (TECs).

3. The system of claim 1, wherein generating the matched-filter image comprises:
performing a convolution of the background-difference image with a point-source function kernel.

4. The system of claim 1, wherein the operations further comprise:
determining one or more candidate space objects within the matched-filter image based on a binary mask, wherein the at least one space object is detected from the one or more candidate space objects.

5. The system of claim 1, wherein generating the output data comprises:
generating an output image corresponding to the background-difference image and the at least one space object.

6. The system of claim 1, comprising:
means for detecting space objects within shortwave infrared (SWIR) images of daytime sky.

7. The system of claim 1, wherein the operations further comprise:
computing a numerical value for each pixel in an array of pixels to be used for the stacked image.

8. The system of claim 1, wherein the operations further comprise:
computing a decorrelated value associated with a pixel of the stacked image.

9. The system of claim 1, wherein the operations further comprise:
determining pixel response non-uniformities in one or both of the stacked image or the plurality of images.

10. The system of claim 1, wherein the operations further comprise:
normalizing signal to noise ratios to a wavelength.

11. The system of claim 1, wherein the ground-based camera system:
is configured to maintain dark currents less than or equal to 100 kilo-electrons per pixel per second;
is configured to capture images with a framerate greater than 100 Hertz; and
comprises an optical train that comprises one or more lowpass filters with cutoff wavelengths between 0.9-1.7 microns, the one or more lowpass filters comprising one or more infrared polarizers.

12. The system of claim 1, wherein the ground-based camera system is responsive to wavelengths between 1.0-1.7 microns.

13. One or more non-transitory computer readable media comprising computer program instructions that, when executed by one or more processors, effectuate operations comprising:
obtaining a stacked image based on a plurality of images of daytime sky, wherein the plurality of images are obtained from a camera system comprising one or more sensors responsive at least to infrared light;
generating (i) a first image based on the stacked image and (ii) a second image by performing a convolution of the first image;
generating a background-difference image by determining a difference between the second image and the first image;
generating a matched-filter image based on the background-difference image, wherein the matched-filter image comprises an array of pixels;
selecting one or more pixels from the array of pixels based on a signal intensity of one or more corresponding pixel values of the one or more pixels in the matched-filter image;
generating at least one cluster having one or more pixel locations of each of the one or more pixels; and
generating, based on the at least one cluster, output data that indicates whether a space object has been detected.

14. The one or more non-transitory computer readable media of claim 13, wherein the output data is generated further based on the background-difference image.

15. The one or more non-transitory computer readable media of claim 14, wherein the operations further comprise:
performing a second convolution based on the background-difference image and a point-source function kernel to obtain the matched-filter image, wherein:
a binary mask is generated further based on the matched-filter image,
candidate space objects are detected based on the matched-filter image, and
the output data indicates whether the space object has been detected based on the candidate space objects.

16. The one or more non-transitory computer readable media of claim 15, wherein generating the output data comprises:

retrieving, based on a location of the camera system when the plurality of images were captured, space object location information indicating a plurality of space objects; and determining that at least one of the candidate space objects is a space object based on at least one confidence measure indicating that the at least one of the candidate space objects is not a false positive, wherein the output data comprises an indication of the space object.

17. The one or more non-transitory computer readable media of claim 13, wherein the stacked image comprises an array of pixels, each pixel of the array of pixels has a stacked numerical value, the one or more sensors are responsive to light having a wavelength of 1 micron, and the first image is generated based on the stacked image, one or more offsets, and one or more gains.

18. The one or more non-transitory computer readable media of claim 17, wherein the one or more sensors include one or more short-wave infrared sensors (SWIR), and the operations further comprise:

obtaining a bias value associated with each SWIR sensor of the one or more SWIR sensors, wherein the one or more offsets comprise the bias value, and wherein a stacked numerical value of each pixel of the array of pixels of the stacked image is adjusted based on the bias value.

19. The one or more non-transitory computer readable media of claim 17, further comprising:

obtaining a correlated noise value associated with each pixel of the array of pixels of the stacked image, wherein the stacked numerical value of each pixel of the array of pixels of the stacked image is adjusted based on the correlated noise value associated with each pixel of the array of pixels of the stacked image.

20. The one or more non-transitory computer readable media of claim 17, further comprising:

determining, based on a precomputed function representing pixel response non-uniformity (PRNU) of each sensor of the one or more sensors, a gain value of each pixel of the array of pixels of the stacked image, and wherein the stacked numerical value of each pixel of the array of pixels of the stacked image is adjusted based on the gain value associated with each pixel of the array of pixels of the stacked image.

21. The one or more non-transitory computer readable media of claim 13, wherein the camera system further comprises one or more thermoelectric coolers (TECs).

22. The one or more non-transitory computer readable media of claim 13, wherein generating the output data comprises:

generating an output image comprising a background-difference image and an observation of the space object.

23. A method comprising:

generating a stacked image by stacking a plurality of images of daytime sky obtained from a camera system comprising one or more sensors;

generating (i) a first image based on the stacked image and (ii) a second image by performing a convolution of the first image;

generating a background-difference image by determining a difference between the second image and the first image;

generating a matched-filter image based on the background-difference image, wherein the matched-filter image comprises an array of pixels;

selecting one or more pixels from the array of pixels based on a signal intensity of one or more corresponding pixel values of the one or more pixels in the matched-filter image for each of the selected one or more pixels;

generating at least one cluster having one or more pixel locations of each of the one or more pixels; and generating, with the computer system and based on the at least one cluster, output data that indicates whether a space object has been detected.

\* \* \* \* \*